(12) United States Patent
Tsirkin et al.

(10) Patent No.: US 10,789,174 B2
(45) Date of Patent: Sep. 29, 2020

(54) GUEST INTERMEDIATE ADDRESS TRANSLATION FOR VIRTUAL MACHINES

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 73 days.

(21) Appl. No.: 15/908,460

(22) Filed: Feb. 28, 2018

(65) Prior Publication Data

US 2019/0266099 A1    Aug. 29, 2019

(51) Int. Cl.
*G06F 12/00* (2006.01)
*G06F 12/1009* (2016.01)
*G06F 9/455* (2018.01)

(52) U.S. Cl.
CPC ...... *G06F 12/1009* (2013.01); *G06F 9/45558* (2013.01); *G06F 2009/45583* (2013.01); *G06F 2212/1008* (2013.01); *G06F 2212/152* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 9,600,419 B2 | 3/2017 | Bybell et al. | |
| 2006/0081020 A1* | 4/2006 | Hsiao | E05B 73/0023 70/57.1 |
| 2008/0215848 A1 | 9/2008 | Sheu et al. | |
| 2009/0113110 A1 | 4/2009 | Chen | |
| 2009/0113164 A1 | 4/2009 | Rajamony et al. | |
| 2010/0306409 A1* | 12/2010 | Jansen | H04L 29/12066 709/245 |
| 2011/0099387 A1* | 4/2011 | Gremaud | G06F 12/1408 713/190 |
| 2014/0156930 A1 | 6/2014 | Isloorkar | |

OTHER PUBLICATIONS

Unknown. "ARM Cortex—A Series Programmer's Guide for ARMv8-A". ARM. Version 1.0. Aug. 2011. ARM DEN0013B. 296 pages.
Devine Scott. Feb 2018. "E6998—Virtual Machines Lecture 3 Memory Virtualization". VMWare, Inc. [PowerPoint Slides]. Retrieve from http://slideplayer.com/slide/4043094/. 32 pages.

(Continued)

*Primary Examiner* — David Yi
*Assistant Examiner* — Craig S Goldschmidt
(74) *Attorney, Agent, or Firm* — Lowenstein Sandler LLP

(57) ABSTRACT

A method for a virtual machine executed by a hypervisor includes identifying, for the virtual machine, mappings between a range of guest virtual addresses (GVAs) and a range of guest physical addresses (GPAs) that remain the same in an initial guest page table for a threshold period of time, creating an intermediate guest page table including one or more page table entries that map the range of the GVAs to a range of guest intermediate addresses (GIAs), and causing the GVA to be translated to a GIA using the intermediate guest page table in view of the one or more page table entries, where the translation is triggered responsive to a guest application of the virtual machine attempting to access a GVA in the range of the GVAs.

20 Claims, 18 Drawing Sheets

Guest Memory 190

Host Memory 140

(56) References Cited

OTHER PUBLICATIONS

Lixin Zhang, Evan Speight, Ram Rajamony, and Jiang Lin. Enigma: Architectural and Operating System Support for Reducing the Impact of Address Translation. In Proceedings of the 24th ACM International Conference on Supercomputing, ICS '10, pp. 159-168, New York, NY, USA, 2010. ACM. 10 pages.

Jayneel Gandhi. (2016). Efficient Memory Virtualization (Unpublished doctoral dissertation). University of Wisconsin-Madison. 175 pages.

* cited by examiner

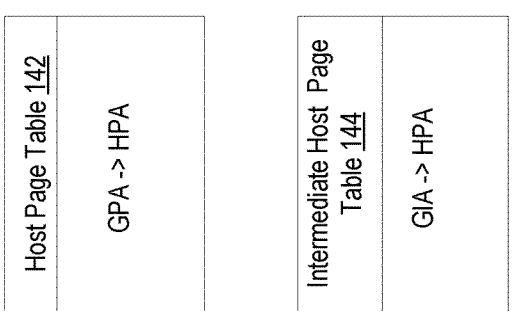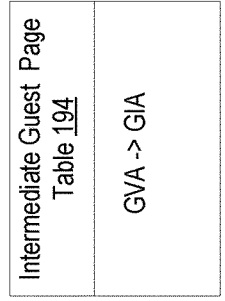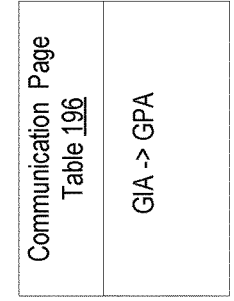
FIG. 2

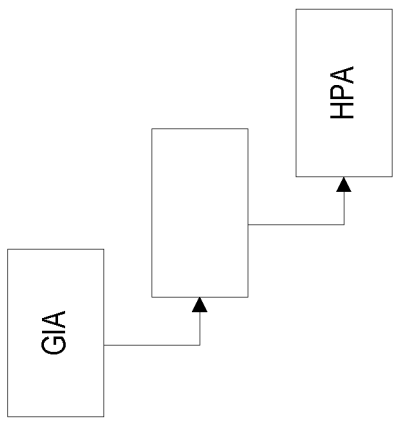
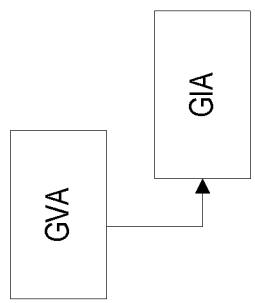
FIG. 3

400

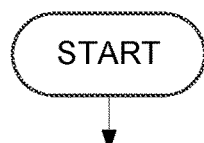

Identify, for a virtual machine, mappings between a range of guest virtual addresses (GVAs) and a range of guest physical addresses (GPAs) that remain the same in an initial guest page table for a threshold period of time 410

Create an intermediate guest page table including one or more page table entries that map the range of the GVAs to a range of guest intermediate addresses (GIAs) 420

Cause the GVA to be translated to a GIA using the intermediate guest page table 194 in view of the on or more page table entries 430

END

START

Responsive to receiving control from the virtual machine, obtain, from the virtual machine, a first mapping of a guest intermediate address (GIA) to a guest physical address (GPA), wherein the GIA is in a guest physical address space and is not mapped to random access memory (RAM) for the virtual machine 1010

Obtain, from an initial host page table of the hypervisor, a second mapping of the GPA to a host physical address (HPA) 1020

Create, using the first mapping and the second mapping, an intermediate host page table including an entry that maps the GIA to the HPA 1030

END

FIG. 10

GUEST INTERMEDIATE ADDRESS TRANSLATION FOR VIRTUAL MACHINES

TECHNICAL FIELD

Embodiments of the present disclosure relate to a computer system, and more specifically, to guest intermediate address translation for virtual machines.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Virtual memory may map virtual memory addresses associated with a guest operating system (e.g., guest applications) of the virtual machine to physical addresses in memory. Various page tables may be used in the virtual machine and a hypervisor to translate the guest virtual addresses to host physical addresses during virtual memory accesses.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 illustrates various page tables used by a virtual machine and a hypervisor, in accordance with one or more aspects of the present disclosure.

FIG. 3 illustrates an intermediate guest page table and an intermediate host page table that improve computing performance, in accordance with one or more aspects of the present disclosure.

FIG. 4 is a flow diagram illustrating an example of a method for a virtual machine using an intermediate guest page table during virtual memory accesses by the virtual machine, in accordance with one or more aspects of the present disclosure.

FIG. 10 is a flow diagram illustrating another example of a method for a hypervisor using an intermediate host page table during virtual memory accesses by the virtual machine, in accordance with one or more aspects of the present disclosure.

DETAILED DESCRIPTION

Figure 1:
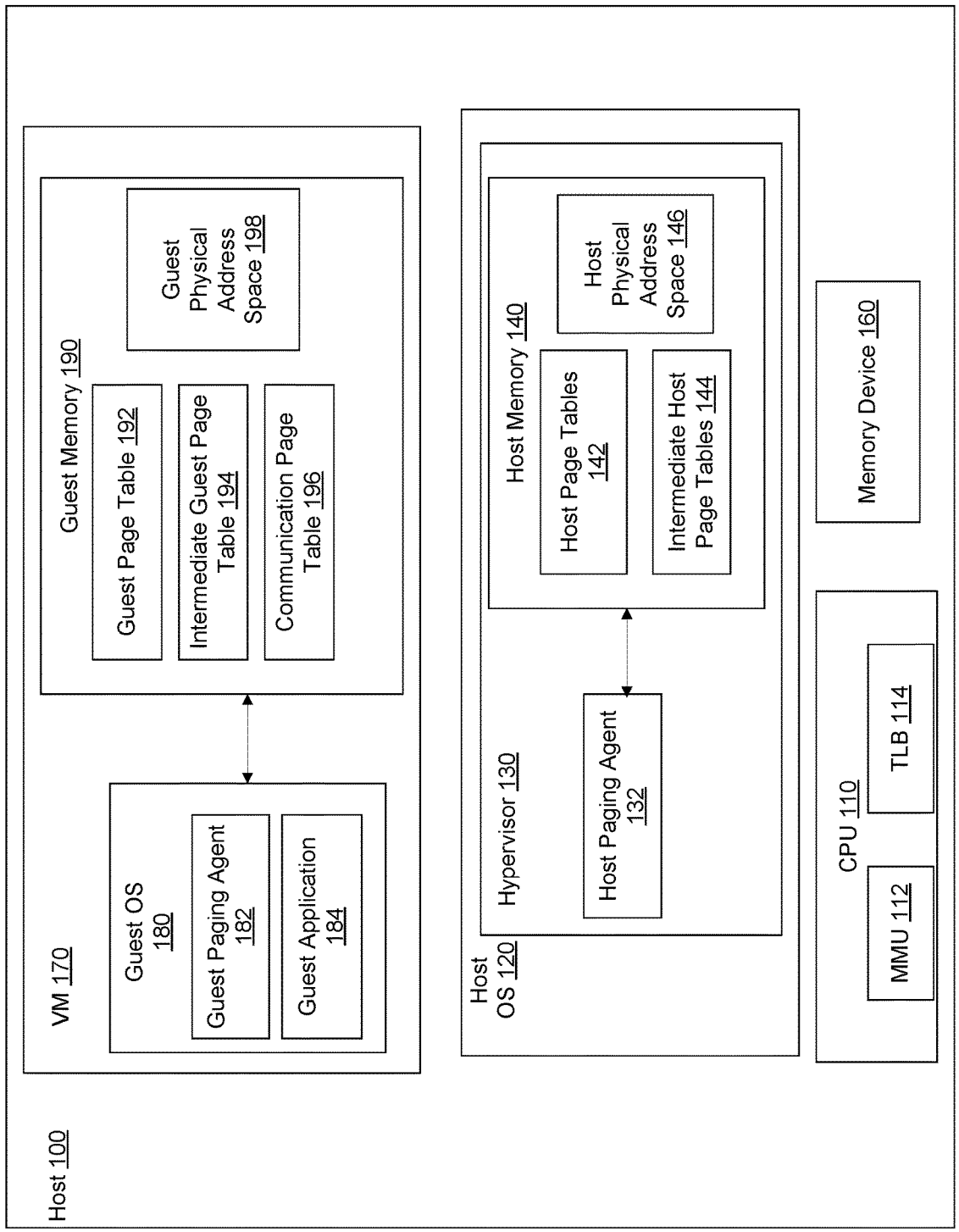
FIG. 1 is a block diagram that illustrates an example computing system in accordance with one or more aspects of the present disclosure.

To perform virtualization, a central processing unit (CPU) of a host machine may use one or more sets of page tables to translate virtual addresses to physical addresses. A first set of page tables may include guest page tables stored in guest memory of a virtual machine (e.g., guest), and a second set of page tables may include host page tables stored in host memory of a hypervisor. The guest page tables may translate guest virtual addresses (GVAs) to guest physical addresses (GPAs), and the host page tables may translate the GPAs to host physical addresses (HPAs) (e.g., actual memory locations).

Two techniques may be used to perform the translation of virtual addresses to physical addresses when the guest accesses virtual memory. A first technique uses extended page tables for a virtual memory access by the guest. A memory management unit (MMU) of the CPU may determine whether mappings that translate GVAs to HPAs are included in a translation lookaside buffer (TLB). If not, the CPU may walk the guest page tables to translate the GVAs accessed by the virtual machine to the GPAs, and then walk the host page tables to translate the GPAs to the HPAs. The translations may be cached in the TLB for faster future lookups. Walking a page table may refer to searching the page table for a particular address mapping.

This technique does not cause the guest operating system ("guest") to transfer control (e.g., exit) to the hypervisor when a change is made to the guest page tables because the hypervisor does not need to update the host page tables. That is, the CPU may walk both the guest page tables and the host page tables to perform the translation so the CPU may detect any changes made in the guest page tables. However, each of the guest page tables and/or the host page tables may include numerous levels (e.g., 3, 4, 5, 6, etc.), and walking numerous levels for both the guest page tables and the host page tables is cumbersome and may degrade memory access performance. As may be appreciated, the greater the number of levels in page tables that have to be walked by the CPU, the slower the performance of memory accesses.

A second technique, referred to as "shadow page tables," may include the hypervisor reading the guest page tables to obtain translations of the GVAs to the GPAs. Then, using the host page tables that include the translations of the GPAs to the HPAs, the hypervisor may generate host page tables that directly translate the GVAs to the HPAs. During a virtual memory access by the guest, the CPU may just use the host page tables to translate the GVAs to the HPAs. That is, the CPU may not need to walk the guest page tables using shadow page tables. However, any change to the mappings between the GVAs and the GPAs in the guest page tables need to be applied to the host page tables and any mappings cached in the TLB need to be flushed. As such, control may be transferred (via a virtual machine exit) to the hypervisor from the guest to enable the hypervisor to update the host page tables and the TLB may be flushed. As a result, performance of the host may be degraded due to the overhead of performing virtual machine exits and updating the host page tables. In some instances, the mappings may change frequently, which may further increase the overhead and decrease performance of the computer host system.

Aspects of the present disclosure address the issues associated with extended page tables discussed above by using a page table with a reduced number of levels in the guest to enable enhanced computational performance during virtual memory accesses. In some embodiments, the hypervisor may enable extended page tables such that the guest maintains initial guest page tables including mappings from GVAs to GPAs and the host maintains initial host page tables including mappings from GPAs to HPAs (e.g., actual memory).

Additionally, the guest may determine when mappings of a range of GVAs to a range of GPAs remain the same for a threshold period of time. The guest may allocate a range of contiguous guest intermediate addresses (GIAs) in a guest physical address space. The area of the guest physical address space where the GIAs are allocated may be referred to as a "guest intermediate address space." Previous to being allocated, this guest intermediate address space may be unused and dormant. The range of contiguous GIAs that are allocated are separate from other addresses of the guest physical address space that are mapped to memory (e.g., random access memory (RAM)) for the guest.

The guest may create an intermediate guest page table that is linked to initial guest page tables (e.g., that translate GVAs to GPAs) and may map the identified range of GVAs (whose mappings to the GPAs do not change) to the range of GIAs using a single large, or small number of large (e.g., megabyte(s), gigabyte(s), terabyte(s), etc.) page table entries in the intermediate guest page table. Selecting GVAs whose mappings to GPAs do not change frequently to map to the GIAs reduces the frequency of transferring control to the hypervisor to perform page table remapping. Accordingly, GVAs with stable mappings to GPAs may be good candidates to establish mappings that do not change to avoid transferring control to the hypervisor, thereby improving computing performance.

Mapping the GVAs to the range of GIAs using the single large page table entry may flatten the intermediate guest page table, thereby reducing the number of levels walked to translate GVAs to GIAs as compared to the initial guest page tables that translate the GVAs to GPAs. That is, this flattening of the intermediate guest page table, which may be linked into the initial guest page table structure, using the GVAs to GIAs mapping may allow the CPU to translate GVA to GIAs faster than translating the GVAs to the GIAs with 3, 4, or 5 levels in the initial guest page table. Accordingly, performance may be enhanced by using the intermediate guest page table during page walks as discussed herein.

The guest may setup the initial guest page table to translate the range of GVAs to a range of GPAs and may setup the intermediate guest page table to translate the range of GVAs to the range of GIAs. The guest may then setup a communication page table that maps the range of GIAs to the range of GPAS. In an implementation, the communication page table may be the same as the initial guest page table. The guest may notify the hypervisor about the communication page table update so the hypervisor can retrieve the mappings of the range of GIAs to the range of GPAs, supply the communication page table to the hypervisor, and/or the hypervisor may detect that the guest is using the range of GIAs and locate the communication page table to obtain the mappings of the range of GIAs to the range of GPAs.

The hypervisor may obtain, using one or more initial host page tables, mappings of the range of GPAs to a range of HPAs. Using those mappings, and the mappings of the range of GIAs to the range of GPAs in the communication page table, the hypervisor may create an intermediate host page table that maps the range of GIAs to the HPAs. Accordingly, a CPU performing a page walk may walk the flattened (e.g., reduced levels) intermediate guest page table to translate an accessed GVA to a GIA and may walk the intermediate host page table to translate the GIA to a respective HPA to access actual memory. Once these translations are obtained, they may be cached in the TLB for faster future lookups.

Further, aspects of the present disclosure address the issues associated with shadow page tables discussed above by enabling applications to switch execution (context switch) on the guest without causing the hypervisor to update its page tables. That is, the guest may switch execution from a first application to a second application without transferring control to the hypervisor to avoid updating any page tables used by the host and also to avoid flushing the TLB. In some embodiments, during allocation of the range of GIAs, the guest may store a memory context tag (e.g., host address space identifier (HASID)) with each range that is associated with an application for which the range of GIAs is allocated. Numerous applications may be associated with the same range of GVAs.

When a second application begins executing, the memory context tag may be used to identify the appropriate range of GIAs allocated for the application and mapped to the range of GVAs. This mapping of the range of GVAs to the range of GIAs for the second application may be located in the intermediate guest page table. Thus, since the second application is associated with a different memory context tag than the first application, different GIAs identified by the different memory context tag may be used for the second application in the intermediate guest page table. In other words, the second application is allocated and uses a different range of GIAs that does not overlap with the range of GIAs allocated and used by the first application. Using the different range of GIAs may not trigger access to the range of GIAs of the first application. As a result, there is no need for hypervisor to change its page tables, unlike with shadow page tables where the hypervisor page tables are updated each time a guest changes the active set of page tables. In some embodiments, a single set of intermediate host page tables may cover multiple intermediate guest page tables, and the appropriate GIAs may be identified for an application executing on the guest using a different memory context tag for each of the guest applications. Such a technique may avoid TLB flushing since the intermediate host page table may not change during context switches. As such, memory access performance may be enhanced for a processing device by avoiding transferring control from the guest to the hypervisor, avoiding changing the intermediate host page table mappings of GIAs to HPAs, and avoiding flushing the TLB.

FIG. 1 is a block diagram of an example of a host computer system 100 according to some embodiments of the present disclosure. The computing system 100 may be a server, a workstation, a personal computer (PC), a mobile phone, a palm-sized computing device, a personal digital assistant (PDA), etc. "Computer system" as used herein may be and/or include a system comprising one or more processors, one or more memory devices, and one or more input/output (I/O) interfaces.

As illustrated, host computer system 100 may include one or more processors 110 (e.g., host central processing units (CPUs)) communicatively coupled to memory devices 160. Local connections within host computer system 100, including connections between processors 110 and memory devices 160, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The processing device 110 may include a memory management unit (MMU) 112 and a translation lookaside buffer 114. The memory management unit 112 may be computer hardware that performs translations of virtual memory addresses to physical addresses of the memory device 160. Although depicted as integrated on the processing device 110, the MMU 112 may be a separate integrated circuit. The MMU 112 may use page tables that contain page table entries (e.g., one per page) that map virtual pages (e.g., guest virtual addresses) to physical pages (e.g., host physical addresses) in main memory. The TLB 114 is a cache of page table entries that may be used to avoid accessing main memory each time a virtual address is accessed. The processing device 110 may perform page table walks to locate any page tables setup in the virtual machine 170 and the hypervisor 130 to use in the MMU 112 and to cache in the TLB 114.

As illustrated in FIG. 1, host computer system 100 may execute (run) one or more virtual machines 170 by executing a software layer 130, often referred to as "hypervisor," above the hardware and below the virtual machines. In certain implementations, hypervisor 130 may be a component of operating system 120 executed by the corresponding host computer system 100. Alternatively, hypervisor 130 may be provided by an application running under host operating system 120, or may run directly on the corresponding host computer system 120 without an operating system beneath it. Hypervisor 130 may abstract the physical layer, including processors, memory, I/O devices, etc. and present this abstraction to virtual machines 170 as virtual devices, including virtual processors, virtual memory, virtual I/O devices, etc. A hypervisor 130 may abstract the physical layer and present this abstraction to virtual machines 170 to use, by providing interfaces between the underlying hardware and virtual devices of virtual machines.

The hypervisor 130 may include a host paging agent 132 and a host memory 140. The host paging agent 132 may be implemented in computer instructions and executable by one or more processing devices 110. The host paging agent 132 may perform various operations discussed herein with reference to FIGS. 8-11 that improve the performance of virtual memory access translation by the processing device 110.

The host memory 140 may include a host physical address space 146 that maintains host physical addresses (HPAs) of the memory device 160. The host memory 140 may also include one or more host page tables 142 (extended host page tables) and one or more intermediate host page tables 144. The hypervisor may enable using extended page tables and initially create the host page tables 142. As such, the host page tables 142 may be referred to as initial host page tables 142 herein. The initial host page tables 142 may include mappings of guest physical addresses (GPAs) to the HPAs (actual memory of the memory device 160). The intermediate host page tables 144 may include mappings of guest intermediate addresses (GIAs) to the HPAs, as discussed further below.

The virtual machine 170 may be referred to as guest 170 interchangeably herein. The virtual machine 170 may include a guest operation system 180 and a guest memory 190. The virtual machine 170 may execute the guest operating system 180 to manage its resources. The virtual machine 170 may run the same or different guest operating system than the host OS 120, such as Microsoft Windows®, Linux®, Solaris®, Mac® OS, etc. The guest OS 180 may execute a guest paging agent 182 and one or more guest applications 184 (e.g., any suitable application such as word processing, spreadsheet, calendar, web browser, calculator, email, etc.). The guest operating system 180 may maintain a page table hierarchy comprising a page directory and a set of page tables to facilitate the translation of virtual addresses into physical addresses.

For example, the guest memory 190 may include a guest physical address space 198, one or more guest page tables 192, an intermediate guest page table 194, and/or a communication page table 196. The guest physical address space 198 may include a first contiguous portion that is allocated for the virtual machine 170 and mapped to the memory device 160 (e.g., random access memory (RAM)). The first portion may include a large amount of memory, such as 1 gigabyte, 1 terabyte, etc. The first portion may begin at address 0 and end at whichever address represents its size (e.g., 1 GB, 1 TB, etc.). The guest physical address space 198 also includes other portions that have higher addresses than the first portion allocated to the virtual machine. These portions may be unused by the virtual machine 170 (e.g., they may be free space in the guest physical address space 198). These other portions may be referred to as guest intermediate addresses (GIAs) herein. Further, the GIAs may be part of a subspace in the guest physical address space 198. The subspace may be referred to as the guest intermediate address space herein.

The one or more guest page tables 192 may be initially setup by the guest in response to the hypervisor 130 enabling use of extended page tables. As such, the guest page tables 192 may be referred to as initial guest page tables 192 herein. The initial guest page tables 192 may map guest virtual addresses (GVAs) to GPAs in the guest physical address space 198 allocated for the virtual machine 170.

Conventionally, in an illustrative example, guest applications 184 being executed by the guest operating system 180 may reference memory locations using GVAs. Responsive to receiving a memory access request, the processing device 110 may translate the referenced GVA to a GPA using the initial guest page table 192 that is managed by the guest operating system 180. The processing device 110 may then translate the GPA to the corresponding HPA using the initial host page table 142 that is managed by the hypervisor 130. An extended page table pointer (EPTP) field of a virtual machine control structure (VMCS) (not shown) holds the physical address of the initial host page table 142.

As discussed above, the initial guest page table 192 and the initial host page table 142 may each include 3, 4, or 5 levels that are walked by the CPU 110 to perform their respective translations, which may hinder computing performance. Accordingly, the techniques described herein may overcome this issue by at least using a flattened intermediate guest page table 194 with fewer levels than the guest page table 192, among other things, to speed up performance, as discussed below.

For example, the guest paging agent 182 of the virtual machine 170 may determine that the mapping of a range of GVAs to a range of GPAs is static. In other words, the mapping of the range of GVAs to the range of GPAs has not changed for a threshold period of time. Selecting the range of GVAs whose mapping to the range of GPAs do not change may improve computing performance because using them as described herein may avoid transferring control to the hypervisor 130 to update any associated page tables. The virtual machine 170 may make this determination because the virtual machine 170 knows what kind of guest applications 184 are running and the memory usage patterns of those guest applications 184.

The guest paging agent 182 may allocate a range of the GIAs in the guest physical address space 198. The range of GIAs may be allocated in the guest physical address space 198 and may be separate from (do not overlap) other addresses in the guest physical address space 198 mapped to the memory device 160 (random access memory (RAM)) for the virtual machine 170. That is, the range of GIAs allocated may not previously be mapped to the memory device 160 or to any other devices (e.g., I/O, NIC, etc.). The range of GIAs that is allocated may have the same size as a range of GVAs. For example, a 1 MB, 1 GB, or 1 TB range of GVAs may cause a 1 MB, 1 GB, or 1 TB range of GIAs, respectively, to be allocated. Further, the range of GIAs may be high addresses in the guest physical address space 198. For example, guest physical addresses may be allocated for the virtual machine 170 from 0 to 1 TB, and the range of GIAs may be allocated at the next highest address (e.g., from 1 TB to 2 TB).

In some embodiments, the range of GIAs may be allocated in non-overlapping portions per guest application 184 running on the guest operating system 180. A memory context tag (e.g., host address space identifier (HASID)) may be stored with the range of GIAs. The memory context tag may be one or more high bits of the range of GIAs and may be associated with the application for which the range of GIAs is allocated. There may be a limited number of memory context tags available for use as they may be limited by architectural size limitations (e.g., 256 TB). For example, if 1 TB is allocated to the virtual machine 170 in the guest physical address space 198, and if the host CPU can address up to 256 TB of guest physical address space 198 then there may be 255 TB chunks available for allocation of 255 ranges of GIAs (1 TB each) and 255 memory context tags available. If there are more than 255 applications that need memory context tags, one or more techniques (e.g., HASID sharing, disabling using HASIDs for certain applications, rebuilding page tables and reassigning HASIDs) may be implemented to handle this scenario, as described further below with reference to FIGS. 11-17.

Also as described further below with reference to FIGS. 11-17, execution switches to different guest applications 184 on the guest operating system 180 may locate and select the appropriate GIAs to use in view of the memory context tag associated with the different guest application 184. The intermediate host page table may include multiple mappings of the ranges of GIAs associated with different memory context tags for applications to HPAs. The host paging agent 132 of the hypervisor 130 may use the memory context tag to identify an associated range of GIAs to map to HPAs, as described below. That is, since each application is allocated a different non-overlapping range of GIAs, switching execution between the applications may not trigger accessing the range of GIAs associated with another application because the memory context tag may be used to identify the non-overlapping range of GIAs for each particular application. This may enhance performance of the memory accesses because the virtual machine 170 may not transfer control to the hypervisor 130 to update any associated page tables and the TLB 114 may not be flushed.

Once the range of GIAs is allocated in the guest physical address space 198, guest paging agent 182 of the virtual machine 170 may map the range of GVAs (for which mappings to the GPAs do not change as determined above) to the allocated range of GIAs using a single large, or a small number of large (e.g., 1 MB, 1 GB, 1 TB) page table entries to create the intermediate guest page table 194. This large page table entry that maps the range of GVAs to the range of GIAs may cause the intermediate guest page table 194 to be flatter (e.g., have less levels to walk) than the initial guest page table 192, which may improve performance.

In some embodiments, the guest paging agent 182 may try to make the range of GVAs align with the range of GIAs. The intermediate guest page table 194 may be linked into the initial page table 192 such that the intermediate guest page table 194 is walked by the processing device 110 during a virtual memory access by a guest application 184.

The guest paging agent 182 may setup the communication page table 196 that maps the range of GIAs to a range of GPAs using the initial guest page table 192 and the intermediate guest page table 194. For example, the guest paging agent 182 may translate the range of GVAs to the range of GPAs as first mappings using the initial guest page table 192 and may translate the range of GVAs to the range of GIAs as second mappings using the intermediate guest page table 194. The guest paging agent 182 may use the first and second mappings to map the range of GIAs to the range of GPAs in a page table entry in the communication page table 196. For example, the mapping in the communication page table 196 may be a linear translation that indicates the range of GIAs from 2 TB to 3 TB is translated to the range of GPAs from 0 to 1 TB.

The guest paging agent 182 may supply the communication page table 196 including the mappings of the GIAs to the GPAs to the host paging agent 132 of the hypervisor 130. In some embodiments, the communication page table 196 may be located in a memory shared by the virtual machine 170 and the hypervisor 130, and the host paging agent 132 may detect when the communication page table 196 is created. For example, the communication page table 196 may be stored in the guest memory 190 and the host paging agent 132 may access the communication page table 196 directly. The host paging agent 132 may create a copy of the communication page table 196 or obtain the mappings of the range of GIAs to the range of GPAs. The guest paging agent 182 may notify the host paging agent 132 that GIAs are being used and indicate a location of the communication page table 196 to obtain the mappings of the GIAs to GPAs, and so forth.

The host paging agent 132 may use the communication page table 196 to look up first mapping from the range of GIAs to the range of GPAs. Further, the host paging agent 132 may use the initial host page tables 142 to translate the range of GPAs identified using the communication page table 196 to a range of HPAs as second mappings. Then, the host paging agent 132 may create the intermediate host page tables 144 that maps the range of GIAs to the range of HPAs using the first mappings and the second mappings. The intermediate host page tables 144 may be linked into the initial host page tables 142 and may be walked by the processing device 110 in response to a virtual memory access by a guest application 184 on the virtual machine 170. It should be understood that the computing performance may be enhanced to translate virtual addresses to physical addresses using the intermediate guest page table 194 to translate GVAs to GIAs and the intermediate host page table 144 to translate GIAs to HPAs because fewer levels may be walked as compared to using the initial guest page table 192 and the initial host page table 142.

Additionally, in some embodiments, when a guest application 184 accesses a GVA, the virtual machine 170 may not trigger a page fault because each guest virtual address associated with the virtual machine 170 may be covered by the single large page table entry or a small number of large page table entries in the intermediate guest page table 194, and the page (guest virtual address) may be marked as present. However, in some instances, the virtual machine 170 may not allow specific pages to be backed by memory, may write protect a page, or the page may be non-executable, so the guest paging agent 182 may not include an entry in the communication page table 196 for the GIA associated with the specific page (GVA). Accordingly, the communication page table 196 may lack an entry mapping the GIA for the GVA to an associated GPA.

When a guest application 184 accesses the specific page (e.g., GVA), the virtual machine 170 may not trigger a page fault, as noted above, because the page is marked as present in the intermediate guest page table 194 including the large entry for each guest virtual address. However, a page fault may be triggered by the hypervisor 130 when the guest application 184 accesses the specific page because the hypervisor 130 cannot locate an entry for the GIA mapped to the specific GVA in the intermediate host page table 144. The host paging agent 132 may pass the page fault to the guest paging agent 182 to handle the page fault and pass the GIA that caused the page fault to the guest paging agent 182.

The guest paging agent 182 may receive the GIA that caused the page fault and obtain the GVA that is associated with the GIA from the mappings in the intermediate guest page table 194. The guest paging agent 182 may then use the GVA to obtain the mapped GPA using the initial guest page table 192. The guest paging agent 182 may create a page table entry in the communication page table 196 that maps the GIA to the obtained GPA. The guest paging agent 182 may notify the host paging agent 132 that the communication page table 196 is updated or the host paging agent 132 may notice that there is an entry for the GIA included in the communication page table 196.

The host paging agent 132 may then obtain the GPA mapped to the GIA in the communication page table 196 and use the GPA to obtain the HPA mapped to the GPA in the initial host page table 142. The host paging agent 132 may then create an entry in the intermediate host page table 144 that maps the GIA directly to the HPA. The host paging agent 132 may enter guest mode by executing a virtual machine entry instruction. Upon the entries in the intermediate page tables being created, the processing device 110 may use the mappings in the intermediate guest page table 194 to translate the accessed GVA to the GIA and may use the intermediate host page table 144 to translate the GIA to the HPA.

FIG. 2 illustrates various page tables used by the virtual machine 170 and the hypervisor 130, in accordance with one or more aspects of the present disclosure. As depicted, the guest memory 190 may store the initial guest page tables 192, the intermediate guest page tables 194, and the communication page tables 196. The initial guest page tables 192 may be setup by the guest paging agent 182 in response to the hypervisor 130 enabling extended page tables. The initial guest page tables 192 may include mappings that translate ranges of GVAs to ranges of GPAs. The intermediate guest page tables 194 may be setup by the guest paging agent 182 and may include mappings of ranges of GVAs to ranges of GIAs. For example, a 1 GB range of GVAs may include a one to one mapping with a 1 GB range of GIAs. Thus, in some embodiments, a single large page table entry, or a small number of large page table entries, may be used to flatten (use a reduced number of levels) the intermediate guest page table 194. Although the intermediate guest page table 194 is depicted separately from the initial guest page table 192, in some embodiments the intermediate guest page table 194 may be included in or linked to the initial guest page tables 192. Accordingly, the intermediate guest page tables 194 may be walked by the processing device 110 when virtual memory is accessed by a guest application 184. The guest paging agent 182 may also setup the communication page table 196 that includes mappings to translate the ranges of GIAs to ranges of GPAs.

The host memory 140 may store the initial host page tables 142 and the intermediate host page tables 144. The initial host page tables 142 may be setup by the host paging agent 132 in response to the hypervisor 130 enabling extended page tables. The initial host page tables 142 may include mappings that translate ranges of GPAs to ranges of HPAs. The intermediate host page tables 144 may include mappings of the ranges of GIAs to the ranges of HPAs. The intermediate host page table 144 may be setup by the host paging agent 132. Although the intermediate host page table 144 is depicted separately from the initial host page table 142, in some embodiments the intermediate host page table 144 may be included in or linked to the initial host page tables 142. Accordingly, the intermediate host page tables 144 may be walked by the processing device 110 when virtual memory is accessed by a guest application 184.

FIG. 3 illustrates the intermediate guest page table 194 and the intermediate host page table 144 that improve computing performance, in accordance with one or more aspects of the present disclosure. As depicted, the intermediate guest page table 194 includes a reduced number of levels to perform the translation of the GVA to the GIA. Conventionally, the initial guest page table may include 3, 4, or 5 levels that are traversed to translate a GVA to a GPA. The intermediate guest page table 194 is flattened to use reduced levels by include a large page table entry (e.g., MB, GB, TB) that maps a range of GVAs to a range of GIAs. The flattening of the intermediate guest page table 194 may enable the processing device 110 to translate the range of GVAs to the range of GIAs faster than translating the range of GVAs to a range of GPAs using the initial guest page tables 192 (e.g., with up to 5 levels in the guest page table tree). Further, as depicted, the intermediate host page table 144 may include a mapping of a range of GIAs to a range of HPAs. The processing device 110 may walk both the intermediate guest page table 194 and the intermediate host page table 144 to translate GVAs to GIAs and GIAs to HPAs.

FIG. 4 is a flow diagram illustrating an example of a method 400 for a virtual machine 170 using an intermediate guest page table 194 during virtual memory accesses by the virtual machine 170, in accordance with one or more aspects of the present disclosure. Method 400 and each of its individual functions, routines, subroutines, or operations may be performed by one or more processing devices of the computer device executing the method 400. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by the guest paging agent 182 of the guest operating system 180 executed by one or more processing devices 110 of the host 100.

At block 410, the processing device may identify, for the virtual machine 170, mappings between a range of guest virtual addresses (GVAs) and a range of guest physical addresses (GPAs) that remain the same in an initial guest page table 192 for a threshold period of time. The threshold period of time may be any suitable period of time. Identifying mappings that are static may be good candidates for using the disclosed techniques because they may not cause control to be transferred to the hypervisor 130 since the hypervisor 130 may not have to update any page tables if the mappings are static. The processing device may monitor the mappings between the range of the GVAs and the range of the GPAs in the initial guest page table 192.

The processing device may allocate a range of GIAs for the range of the GVAs in the guest physical address space 198 that is separate from other addresses in the guest physical address space 198 mapped to random access memory (RAM) (e.g., memory device 160) for the virtual machine 170. The range of GIAs may be allocated at higher addresses than a highest address of the other addresses in the guest physical address space 198 mapped to RAM for the virtual machine 170. In some embodiments, a different range of GIAs may be allocated for each guest application 184 that is running on the guest operating system 180. Also, a memory context tag (e.g., host address space identifier (HASID)) may be stored in the range of GIAs to identify the application associated with the particular range of GIAs.

At block 420, the processing device may create an intermediate guest page table 194 including one or more page table entries that map the range of the GVAs to a range of guest intermediate addresses (GIAs). As such, in some embodiments, the range of GIAs may be set equal to the range of GVAs plus an offset (e.g., 1 MB, 1 GB, 1 TB, etc.). The intermediate page table 194 may be stored in the guest memory 190. In some embodiments, a single large page table entry, or a small number of large page table entries, may be included in the intermediate guest page table 194.

The single large page table entry may be the same size as the range of GVAs. For example, a 1 GB range of GVAs may be mapped to a 1 GB range of GIAs in the page table entry. In some embodiments, more than one page table entry may be used to store the mapping.

In some embodiments, the processing device may translate, using the initial guest page table 192 (e.g., mappings of GVAs to GPAs) or another data structure, the range of the GVAs to the range of the GPAs as first mappings. The processing device may also create, using the first mappings and the one or more page table entries of the intermediate guest page table 194 that map the range of the GVAs to the range of the GIAs, a guest communication page table 196 including mappings of the range of the GIAs to the range of the GPAs as second mappings. In an implementation, the guest communication page table 196 may be the same as the initial page table 192. The processing device may notify the hypervisor 130 of the guest communication page table 196 or supply the communication page table 196 to the hypervisor 130 to enable the host paging agent 132 to create an intermediate host page table 144 including one or more page table entries that map the range of GIAs to a range of host physical addresses (HPAs) using at least the second mappings.

At block 430, the processing device may cause the GVA to be translated to a GIA using the intermediate guest page table 194 in view of the one or more page table entries. The translation may be triggered responsive to a guest application 184 of the virtual machine 170 attempting to access a GVA in the range of the GVAs. In some embodiments, translating the GVA to the GIA may use a fewer number of levels of the intermediate guest page table 194 than a number of levels of the initial guest page table 192 used to translate the GVA to a GPA. Accordingly, the intermediate guest page table 194 may improve processing speed during virtual memory accesses.

In some embodiments, a page fault may be triggered by the hypervisor 130 in response to the guest application 184 accessing a guest virtual address because the intermediate host page table 144 may lack an entry for the GIA associated with the accessed GVA to a HPA. For example, responsive to the guest application 184 of the virtual machine 170 attempting to access the GVA in the range of the GVAs, the processing device may transition control to the hypervisor 130 by passing the GIA mapped to the GVA to the hypervisor 130. The hypervisor 130 may trigger the page fault because there may not be a mapping of the GIA to an HPA in the intermediate host page table 144. The hypervisor 130 may identify the GIA that triggered the page fault and search the communication page table 196 for a mapping between the GIA and a GPA. The hypervisor 130 may also use the GPA to search the initial host page tables 142 to determine the HPA in the host physical address space 146 to which the GPA should be mapped. The hypervisor 130 may use the GIA to GPA mapping and the GPA to HPA mapping to create an entry in the intermediate host page table 144 that maps the GIA to the HPA.

Figure 5:
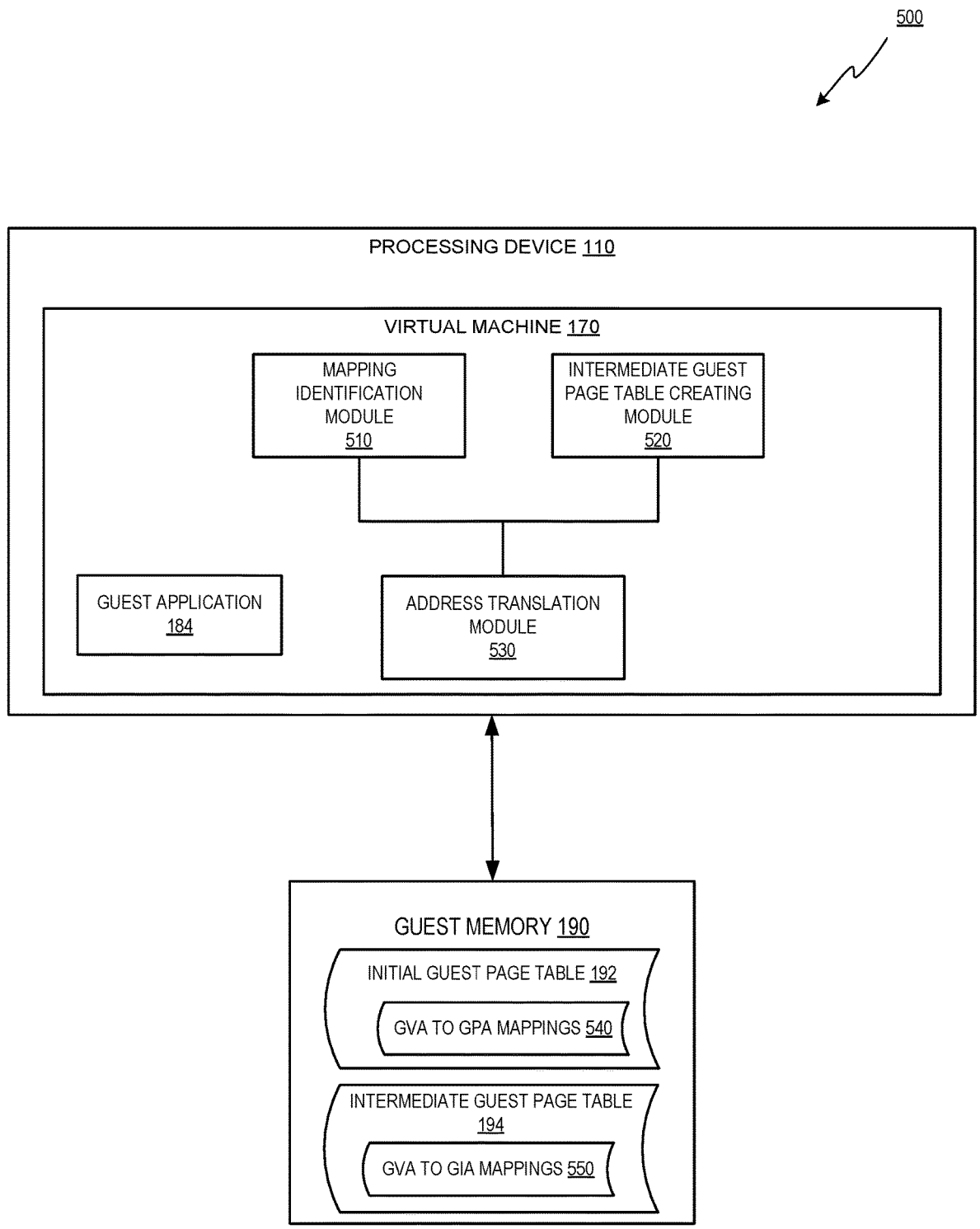
FIG. 5 depicts a block diagram of an example computer system for performing the method of FIG. 4, in accordance with one or more aspects of the present disclosure.

FIG. 5 depicts a block diagram of an example computer system 500 for performing the method 400 of FIG. 4, in accordance with one or more aspects of the present disclosure. Computer system 500 may be the same or similar to the host 100 and may include one or more processing devices and one or more memory devices. In the example shown, computer system 500 may include the processing device 110 executing the virtual machine 170. The virtual machine 170 may include mapping identification module 510, intermediate guest page table creating module 520, and address translation module 530. The virtual machine 170 may be executing the guest application 184. Also, as depicted, processing device 110 may be communicatively coupled to the guest memory 190. The guest memory 190 may store the initial guest page table 192 that includes GVA to GPA mappings 540 and the intermediate guest page table 194 that includes GVA to GIA mappings 550.

The mapping identification module 510 may identify, for the virtual machine 170, the mappings 540 between a range of guest virtual addresses (GVAs) and a range of guest physical addresses (GPAs) that remain the same in an initial guest page table 192 for a threshold period of time. The threshold period of time may be any suitable period of time. The processing device may monitor the mappings 540 between the range of the GVAs and the range of the GPAs in the initial guest page table 192.

The processing device may allocate a range of GIAs for the range of the GVAs in the guest physical address space 198 that is separate from other addresses in the guest physical address space 198 mapped to random access memory (RAM) (e.g., memory device 160) for the virtual machine 170. The range of GIAs may be allocated at higher addresses than a highest address of the other addresses in the guest physical address space 198 mapped to RAM for the virtual machine 170.

The intermediate guest page table creating module 520 may create an intermediate guest page table 194 including one or more page table mappings 550 of the range of the GVAs to a range of guest intermediate addresses (GIAs). The intermediate page table 194 may be stored in the guest memory 190. In some embodiments, a single large page table entry, or a small number of large page table entries, may be included in the intermediate guest page table 194. A large page table entry may be the same size as the range of GVAs. For example, a 1 GB range of GVAs may be mapped to a 1 GB range of GIAs in the page table entry.

The address translation module 530 may, responsive to the guest application 184 of the virtual machine 170 attempting to access a GVA in the range of the GVAs, translate the GVA to a GIA using the intermediate guest page table 194 in view of the mappings 550. In some embodiments, translating the GVA to the GIA may use a fewer number of levels of the intermediate guest page table 194 than a number of levels of the initial guest page table 192 used to translate the GVA to a GPA. Accordingly, the intermediate guest page table 194 may improve processing speed during virtual memory accesses. The GIA may be translated to a respective HPA by the hypervisor 130 using the intermediate host page table 144.

Figure 6:
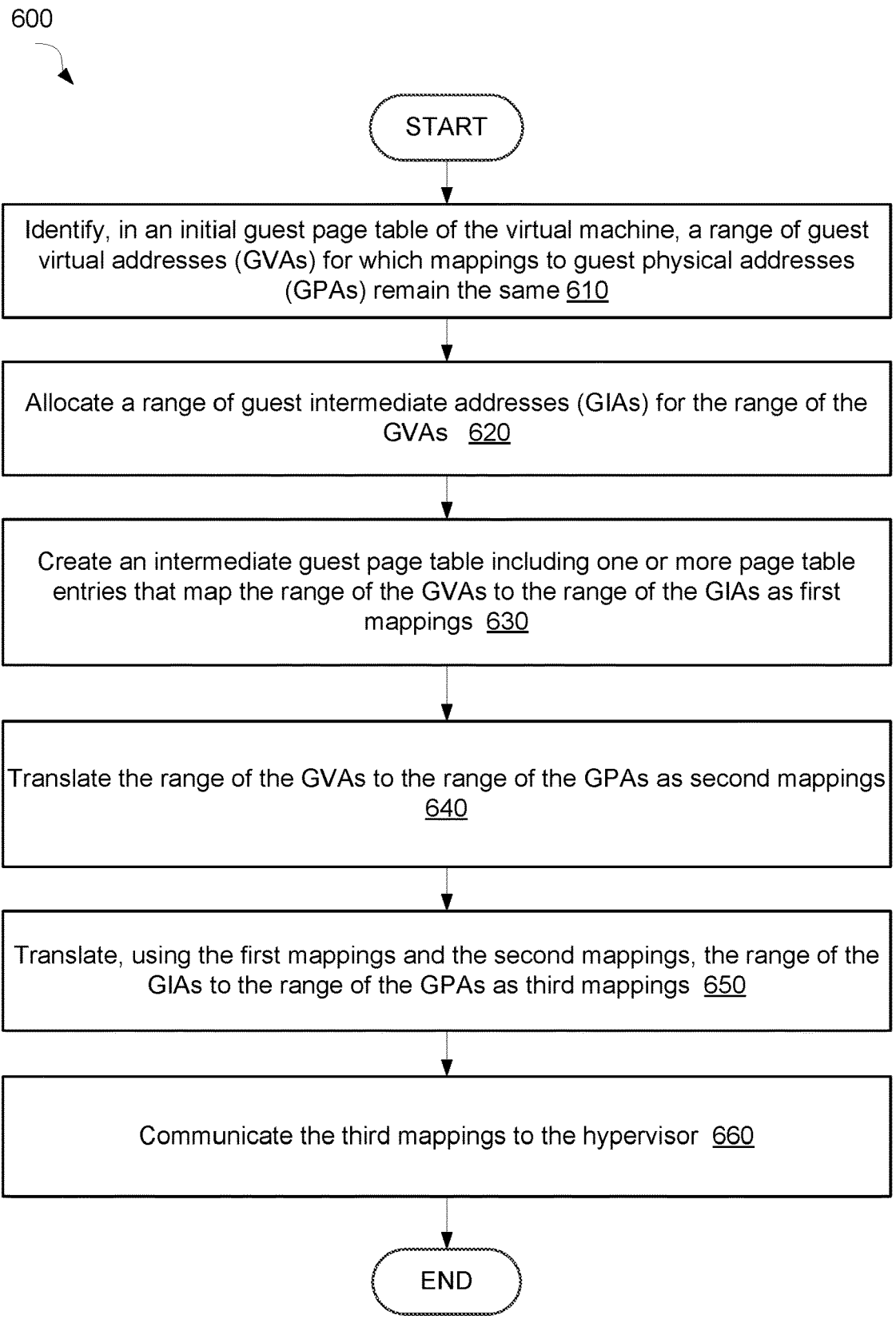
FIG. 6 is a flow diagram illustrating another example of a method for a virtual machine using an intermediate guest page table during virtual memory accesses by the virtual machine, in accordance with one or more aspects of the present disclosure.

FIG. 6 is a flow diagram illustrating another example of a method 600 for a virtual machine 170 using an intermediate guest page table 194 during virtual memory accesses by the virtual machine 170, in accordance with one or more aspects of the present disclosure. Method 600 includes operations performed by the host 100. Also, method 600 may be performed in the same or a similar manner as described above in regards to method 400. Method 600 may be performed by processing devices 110 of the host 100 executing the guest paging agent 182 of the guest operating system 180.

At block 610, the processing device may identify, in an initial guest page table 192 of the virtual machine 170, a range of guest virtual addresses (GVAs) for which mappings to guest physical addresses (GPAs) remain the same. At block 620, the processing device may allocate a range of guest intermediate addresses (GIAs) for the range of the GVAs. The GIAs may be allocated in a guest physical address space 198 separate from other addresses in the guest physical address space 198 mapped to random access memory (RAM) for the virtual machine 170.

At block 630, the processing device may create an intermediate guest page table 194 including one or more page table entries that map the range of the GVAs to the range of the GIAs. The intermediate guest page table 194 may be stored in the guest memory 190. In some embodiments, the range of the GVAs may be mapped to the range of GIAs in a single large page table entry, or a small number of large page table entries, in the intermediate guest page table 194.

At block 640, the processing device may translate, using the initial guest page table 194, the range of the GVAs to the range of the GPAs. The initial guest page table 194 may be setup by the guest paging agent 182 in response to the host enabling extended page tables.

At block 650, the processing device may translate, using the mappings of the range of GVAs to the range of GIAs and the mappings of the range of GVAs to the range of GPAs, the range of the GIAs to the range of the GPAs. The processing device may create a communication page table 196 that includes the mappings of the range of the GIAs to the range of the GPAs as one or more page table entries. The communication page table 196 may be stored in the guest memory 190.

At block 660, the processing device may communicate the third mappings to the hypervisor 130. To communicate the third mappings to the hypervisor 130 the processing device may supply the communication page table 196 including the third mappings to the hypervisor 130 or notify the hypervisor of the third mappings to enable the hypervisor 130 to retrieve the third mappings. In some embodiments, communicating the third mappings to the hypervisor 130 may cause the hypervisor 130 to create an intermediate host page table 144 that maps the range of GIAs to a range of host physical addresses using at least the third mappings.

In some embodiments, the processing device may receive, from a guest application 184 of the guest operating system 180, a request to access a GVA in the range of GVAs. The processing device may translate, using the intermediate guest page table 194, the GVA to a respective GIA in the range of GIAs. Translating the GVA to the respective GIA may use a fewer number of levels of the intermediate guest page table 194 than a number of levels of the initial guest page table 192 used to translate the GVA to a GPA. Further, responsive to receiving, from the guest application 184, the request to access the GVA in the range of the GVAs, the processing device may transition control to the hypervisor 130 by passing the respective GIA to the hypervisor 130 to cause the hypervisor 130 to locate a mapping between the respective GIA and a GPA using the third mappings in the communication page table 196, and to create an entry in a host intermediate page table 144 that maps the GIA to a HPA using at least the mapping between the respective GIA and the GPA.

Figure 7:
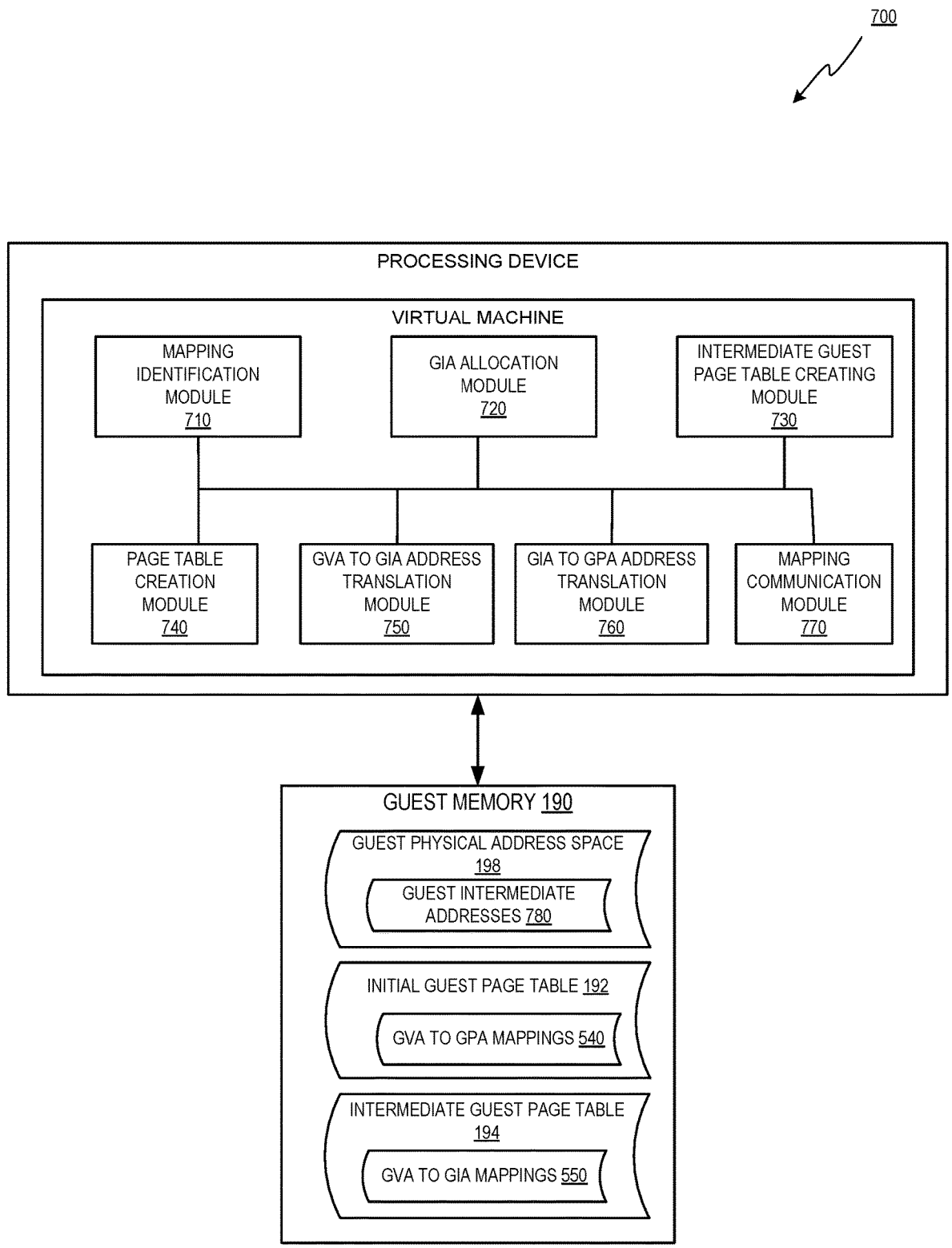
FIG. 7 depicts a block diagram of an example computer system for performing the method of FIG. 6, in accordance with one or more aspects of the present disclosure.

FIG. 7 depicts a block diagram of an example computer system 700 for performing the method of FIG. 6, in accordance with one or more aspects of the present disclosure. Computer system 700 may be the same or similar to the host 90 and may include one or more processing devices and one or more memory devices. In the example shown, computer system 700 may include the processing device 110 executing the virtual machine 170. The virtual machine 170 may execute mapping identification module 710, GIA allocation module 720, intermediate guest page table creating module 730, page table creation module 740, GVA to GIA address translation module 750, GIA to GPA address translation module 760, and mapping communication module 770.

Also, as depicted, processing device 110 may be communicatively coupled to the guest memory 190, which may include the guest physical address space 198, the initial guest page table 192, and the intermediate guest page table 194. The guest physical address space 198 may include the guest intermediate addresses 780. The initial guest page table 192 may include the GVA to GPA mappings 540, and the intermediate guest page table 194 may include the GVA to GIA mappings 550.

The mapping identification module 710 may identify, in an initial guest page table 192 of the virtual machine 170, a range of GVAs for which mappings 540 to GPAs remain the same. The GIA allocation module 720 may allocate a range of GIAs 780 for the range of the GVAs. The GIAs 780 are allocated in the guest physical address space 198 separate from other addresses in the guest physical address space 198 mapped to random access memory (RAM) for the virtual machine 170.

The intermediate guest page table creating module 730 may create the intermediate guest page table 194 including one or more page table entries that map the range of the GVAs to the range of the GIAs. In some embodiments, a single large page table entry, or a small number of large page table entries, may be made for the mapping of the range of the GVAs to the range of the GIAs as mappings 550.

The GVA to GIA address translation module 750 may translate, using the initial guest page table 192, the range of the GVAs to the range of the GPAs as mappings 540. The GIA to GPA address translation module 760 may translate, using the GVA to GPA mappings 540 and the GVA to GIA mappings 550, the range of the GIAs to the range of the GPAs. The processing device may create the communication page table 196 that stores these mappings.

Figure 8:
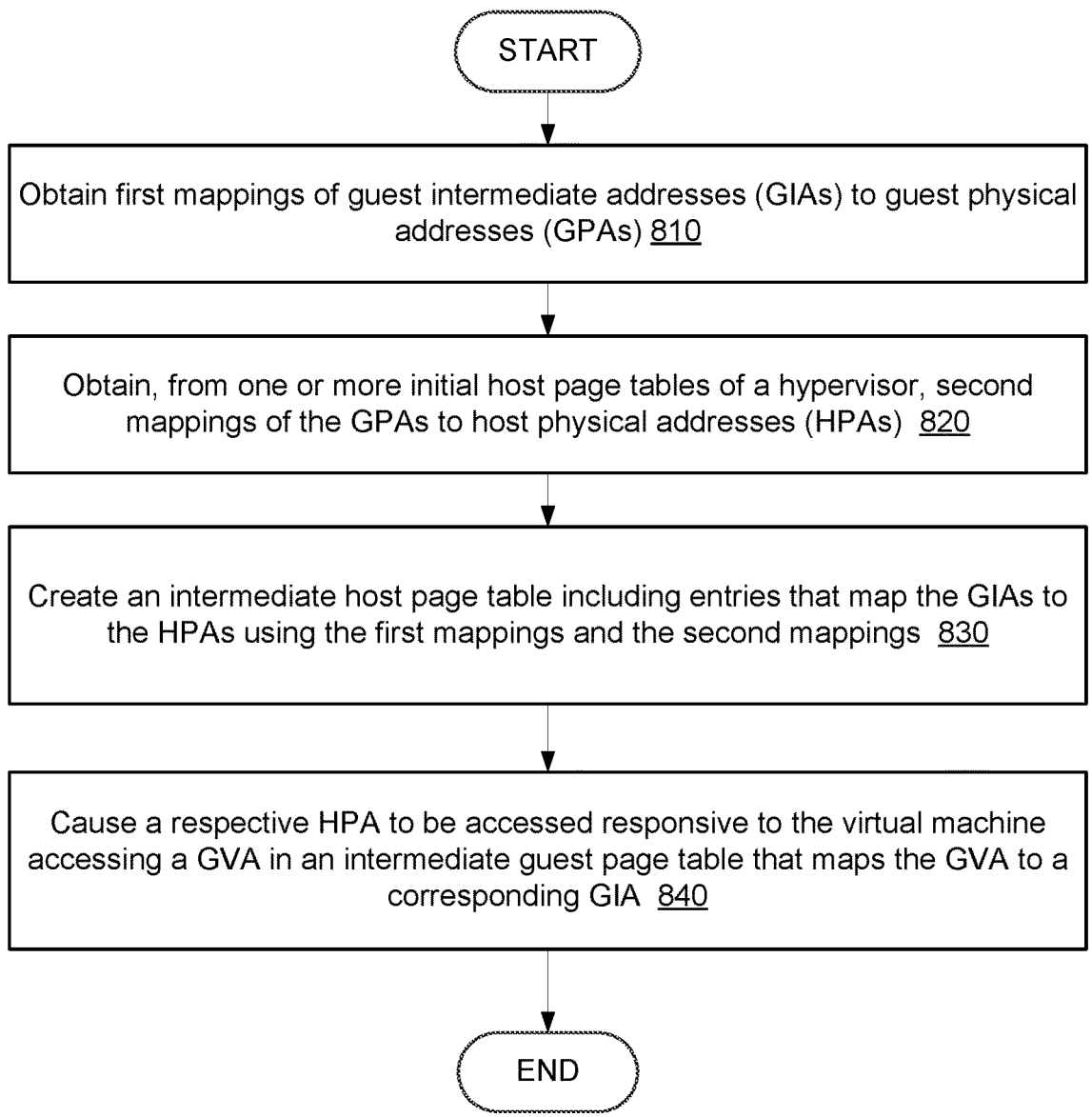
FIG. 8 is a flow diagram illustrating an example of a method for a hypervisor using an intermediate host page table during virtual memory accesses by the virtual machine, in accordance with one or more aspects of the present disclosure.

FIG. 8 is a flow diagram illustrating an example of a method 800 for a hypervisor 130 using an intermediate host page table 144 during virtual memory accesses by the virtual machine 170, in accordance with one or more aspects of the present disclosure. Method 800 includes operations performed by the host 100. Also, method 800 may be performed in the same or a similar manner as described above in regards to method 400. Method 800 may be performed by processing devices of the host 100 executing the host paging agent 132 of the hypervisor 130.

At block 810, a processing device may obtain first mappings of guest intermediate addresses (GIAs) to guest physical addresses (GPAs). The processing device may obtain the first mappings by accessing the communication page table 196 stored in the guest memory 190 (e.g., a shared memory location). Further, the processing device may obtain the first mappings by receiving the communication page table 196 including the first mappings from the virtual machine 170. In some embodiments, the processing device may make a copy of the communication page table 196 including the first mappings. The GIAs may be allocated by the virtual machine 170 in a portion of the guest physical address space 198 that is separate from another portion of the guest physical address space 198 that includes addresses mapped to random access memory (RAM) for the virtual machine 170.

At block 820, the processing device may obtain, from one or more initial host page tables 142 of the hypervisor 130, second mappings of the GPAs to host physical addresses (HPAs). The processing device may obtain the GPAs from the communication page table 196 and use the obtained GPAs to search the initial host page tables 142 for the respective HPAs.

At block 830, the processing device may create an intermediate host page table 144 including entries that map the GIAs to the HPAs using the first mappings (GIAs to GPAs) and the second mappings (GPAs to HPAs). At block 840, the processing device may cause a respective HPA to be accessed responsive to the virtual machine 170 accessing a GVA in an intermediate guest page table 194 that maps the GVA to a corresponding GIA.

In some embodiments, responsive to a guest application 184 that is executing on the virtual machine 170 accessing a second GVA that lacks a corresponding second GIA mapped to a second HPA in the intermediate host page table 144, the processing device may receive control from the virtual machine 170 (e.g., via the virtual machine 170 executing a virtual machine exit instruction). The processing device may trigger a page fault in the hypervisor 170 upon not finding an entry for the second GIA in the intermediate host page table 144. Further, the processing device may forward the page fault to the virtual machine 170. The virtual machine 170 may receive the GIA that triggered the page fault and identify the associated GVA for the GIA using the intermediate guest page table 194. Then, the virtual machine 170 may locate the GPA mapped to the GVA. The virtual machine 170 may create an entry in the communication page table 196 that maps the GIA to the GPA and notify the hypervisor that the communication page table 196 includes the GIA mapping to the GPA. The processing device may update the intermediate host page table 144 with a mapping of the GIA to a respective HPA.

Figure 9:
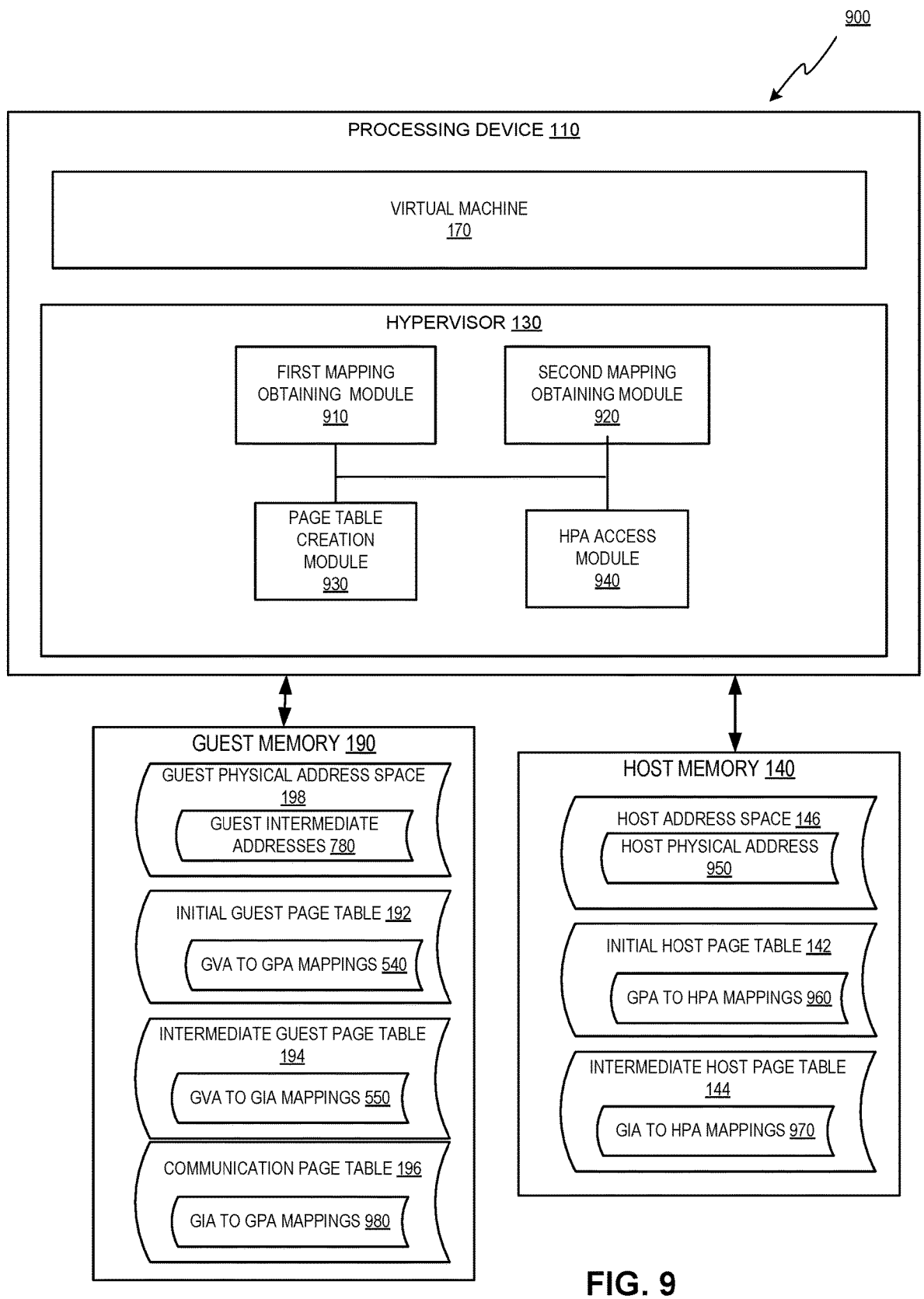
FIG. 9 depicts a block diagram of an example computer system for performing the method of FIG. 8, in accordance with one or more aspects of the present disclosure.

FIG. 9 depicts a block diagram of an example computer system 900 for performing the method of FIG. 8, in accordance with one or more aspects of the present disclosure. Computer system 900 may be the same or similar to the host 100 and may include one or more processing devices and one or more memory devices. In the example shown, computer system 900 may include the processing device 110 executing the hypervisor 130 and the virtual machine 170. The hypervisor may execute first mapping obtaining module 910, second mapping obtaining module 920, and page table creation module 930, and HPA access module 940.

Also, as depicted, the processing device 110 may be communicatively coupled to the guest memory 190 and the host memory 140. The guest memory 190 may include the guest physical address space 198, the initial guest page table 192, the intermediate guest page table 194, and the communication page table 196. The guest physical address space 198 may include the guest intermediate addresses 780. The initial guest page table 192 may include the GVA to GPA mappings 540, and the intermediate guest page table 194 may include the GVA to GIA mappings 550. The communication page table 196 may include the GIA to GPA mappings 980.

The host memory 140 may include the host physical address space 146, the initial host page table 142, and the intermediate host page table 144. The host physical address space 146 may include the host physical addresses 950. The initial host page table 142 may include the GVA to GPA mappings 960, and the intermediate host page table 144 may include the GIA to HPA mappings 970.

The first mapping module 910 may include obtaining the first mappings 980 of the GIAs to the GPAs. In some embodiments, the mappings 980 may be obtained from the communication page table 196 either accessed in the guest memory 190 or received from the virtual machine 170. The second mapping module 920 may obtain, from one or more initial host page tables 142 of the hypervisor 130, second mappings 960 of the GPAs to HPAs.

The page table creation module 930 may create an intermediate host page table 144 including entries that map the GIAs to the HPAs using the first mappings 980 and the second mappings 960. The HPA access module 940 may cause a respective HPA to be accessed responsive to the virtual machine 170 accessing a GVA in the intermediate guest page table 194 that maps the GVA to a corresponding GIA.

FIG. 10 is a flow diagram illustrating another example of a method 1000 for a hypervisor 130 using an intermediate host page table 144 during virtual memory accesses by the virtual machine 170, in accordance with one or more aspects of the present disclosure. Method 1000 includes operations performed by the host 1200. Also, method 1000 may be performed in the same or a similar manner as described above in regards to method 1000. Method 1000 may be performed by processing devices of the host 100 executing the host paging agent 132 of the hypervisor 130.

At block 810, a processing device may, responsive to control being transitioned to the hypervisor 130 from the virtual machine 170, obtain, from the virtual machine 170, a first mapping of a guest intermediate address (GIA) to a guest physical address (GPA). The virtual machine may transition control to the hypervisor 130 responsive to an access, by a guest application 184 executing on the virtual machine 170, to a GVA that is mapped to the GIA. The virtual machine 170 may pass the GIA to the hypervisor during control transfer (e.g., via a virtual machine exit instruction).

The GIA may be in the guest physical address space 198 and may not be mapped to random access memory (RAM) for the virtual machine 170. In some instances, the hypervisor 130 may retrieve the mapping of the GIA to the GPA by receiving the GIA from the virtual machine 170 and determining that the intermediate host page table 144 lacks an entry mapping the GIA to an HPA. In some a case, the hypervisor 130 may trigger a page fault. The hypervisor may send the page fault to the virtual machine 170 to handle, as discussed above. In some embodiments, the hypervisor 130 may inspect the communication page table 196 in the guest memory 190, which may be shared with the hypervisor 130, to obtain the first mapping of the GIA to the GPA.

At block 820, the processing device may obtain, from an initial host page table 142 of the hypervisor 130, a second mapping of the GPA to a host physical address (HPA) based on the GPA obtained from the communication page table 196 for the GIA. Further, at block 830, the processing device may create, using the first mapping of the GIA to the GPA and the second mapping of the GPA to the HPA, an intermediate host page table 144 including an entry that maps the GIA to the HPA. In some embodiments, the processing device may return control to the virtual machine 170 by executing a virtual machine entry instruction to enable the virtual memory accesses to GVAs to be translated to corresponding HPAs.

Figure 11:
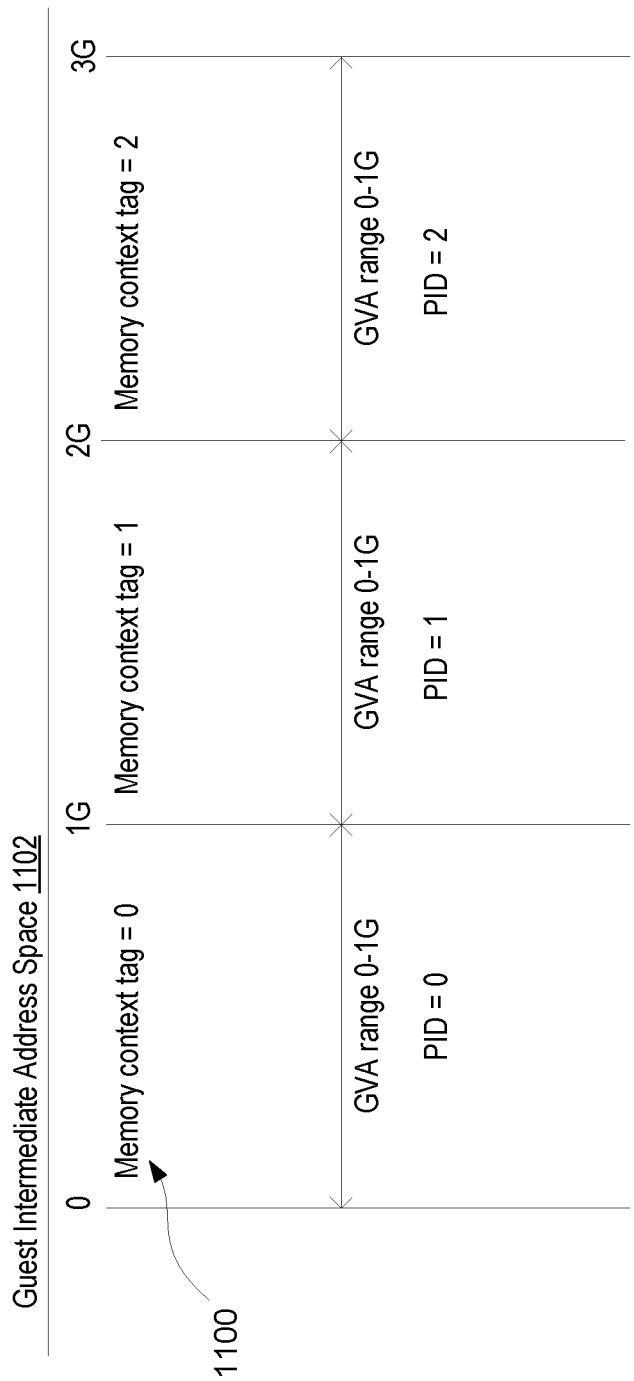
FIG. 11 illustrates ranges of guest intermediate addresses allocated for applications and including memory context tags that identify the applications, in accordance with one or more aspects of the present disclosure.

FIG. 11 illustrates ranges of guest intermediate addresses allocated for guest applications 184 and including memory context tags 1100 (e.g., host address space identifier (HASID)) that identify the guest applications 184, in accordance with one or more aspects of the present disclosure. As depicted, the guest intermediate addresses may include a range from 0 to 1 GB, 1 GB to 2 GB, and 2 GB to 3 GB. Although, just three intermediate address ranges are depicted, it should be understood that numerous guest intermediate address ranges may be allocated based on the number of processes executing on the virtual machine 170 and the architectural limitations of hardware (e.g., processing device 110, memory device 160, etc.).

The guest intermediate addresses may reside in a guest intermediate address space 1102 that is included in the guest physical address space 198. Initially, the guest intermediate address ranges may be unused portions of the guest physical address space 198 that are not mapped to random access memory (RAM) for the virtual machine 170. For example, 1 GB of the guest physical address space 198 may be initially allocated for the virtual machine 170 and mapped to RAM. The guest intermediate address space 1102 may begin at the next highest address subsequent to the highest address of the guest physical address space 198 allocated for the virtual machine 170. Accordingly, a first process or application executing on the virtual machine 170 may be allocated a guest intermediate address range of 0 to 1 GB in the guest intermediate address space 1102, which may correspond to 1 GB to 2 GB in the guest physical address s pace 198.

Figure 12:
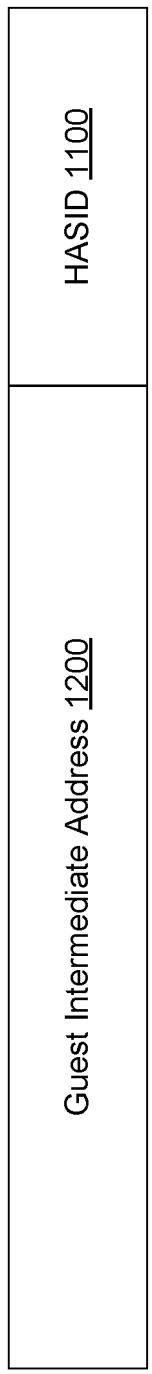
FIG. 12 illustrates a guest intermediate address storing a memory context tag, in accordance with one or more aspects of the present disclosure.

Each range of guest intermediate addresses may be assigned a memory context tag (e.g., host address space identifier (HASID)) to associate that particular guest intermediate address range with a particular guest application 184. The ranges of GIAs for each application may not overlap one another. The HASID 1100 may be one or more high bits stored in a field of a guest intermediate address 1200 (as depicted in FIG. 12) in a page table entry of the intermediate guest page table 194. Further, each guest application 184 may each be assigned a process identifier (PID) that may be used to associate the guest application 184 with the guest intermediate address range in view of the memory context tag 1100. For example, a first guest intermediate address range may be 0 to 1 GB and include a memory context tag of 0 that is associated with a guest application 184 having a PID of 0. Each application may include a range of guest virtual addresses (GVAs). In some instances, multiple guest applications 184 may be associated with the same range of GVAs (e.g., 0 to 1 GB).

The memory context tags 1100 may be used to locate and select the appropriate page table entries in the intermediate guest page table 194 such that control is not transferred to the hypervisor 130 from the virtual machine 170. Since each application is associated with a different memory context tag that is used to identify the appropriate range of GIAs to use when the application executes, there is no need to notify the hypervisor 130 and no need for the hypervisor to change its page tables (e.g., host page tables 142 and/or intermediate host page tables 144). That is, using the memory context tagging techniques described herein may improve computing performance because the mappings from the range of GIAs to the GPAs in the communication page table may remain unchanged when switching contexts (e.g., switching execution of guest applications 184 on the virtual machine 170) by using different guest intermediate address ranges for the guest applications 184.

For example, a first guest application and a second guest application may both be associated with the same range of GVAs (e.g., 0 to 1 GB). The first guest application may have a PID of 0 that is associated with a first memory context tag of 0 that identifies a first guest intermediate address range of 0 to 1 GB, and the second guest application may have a PID of 1 that is associated with a second memory context tag of 1 that identifies a second guest intermediate address range of 1 GB to 2 GB. The second GIA range may not overlap the first GIA range. The first application may execute on the guest operating system 180 and attempt to access its range of GVAs from 0 to 1 GB. The guest operating system 180 may locate and select the first range of guest intermediate addresses (e.g., 0 to 1 GB) in view of the memory context tag of 0 associated with the first guest application (e.g., PID of 0) using the mappings of the range of GVAs (e.g., 0 to 1 GB) to the range of GIAs (e.g., 0 to 1 GB) in the intermediate guest page table 194. When the second guest application begins executing, the guest operating system 180 may locate and select the second range of guest intermediate addresses (e.g., 1 GB to 2 GB) in view of the memory context tag of 1 associated with the second guest application (e.g., PID of 1) using the mappings of the range of GVAs (0 to 1 GB) to the range of GIAs (e.g., 1 GB to 2 GB) in the intermediate guest page table 194. As such, different ranges of GIAs may be used for the different applications and there is no need to notify the hypervisor 130 when switching between executing applications because the memory context tags may be used to identify the different ranges of GIAs for the applications.

Figure 13:
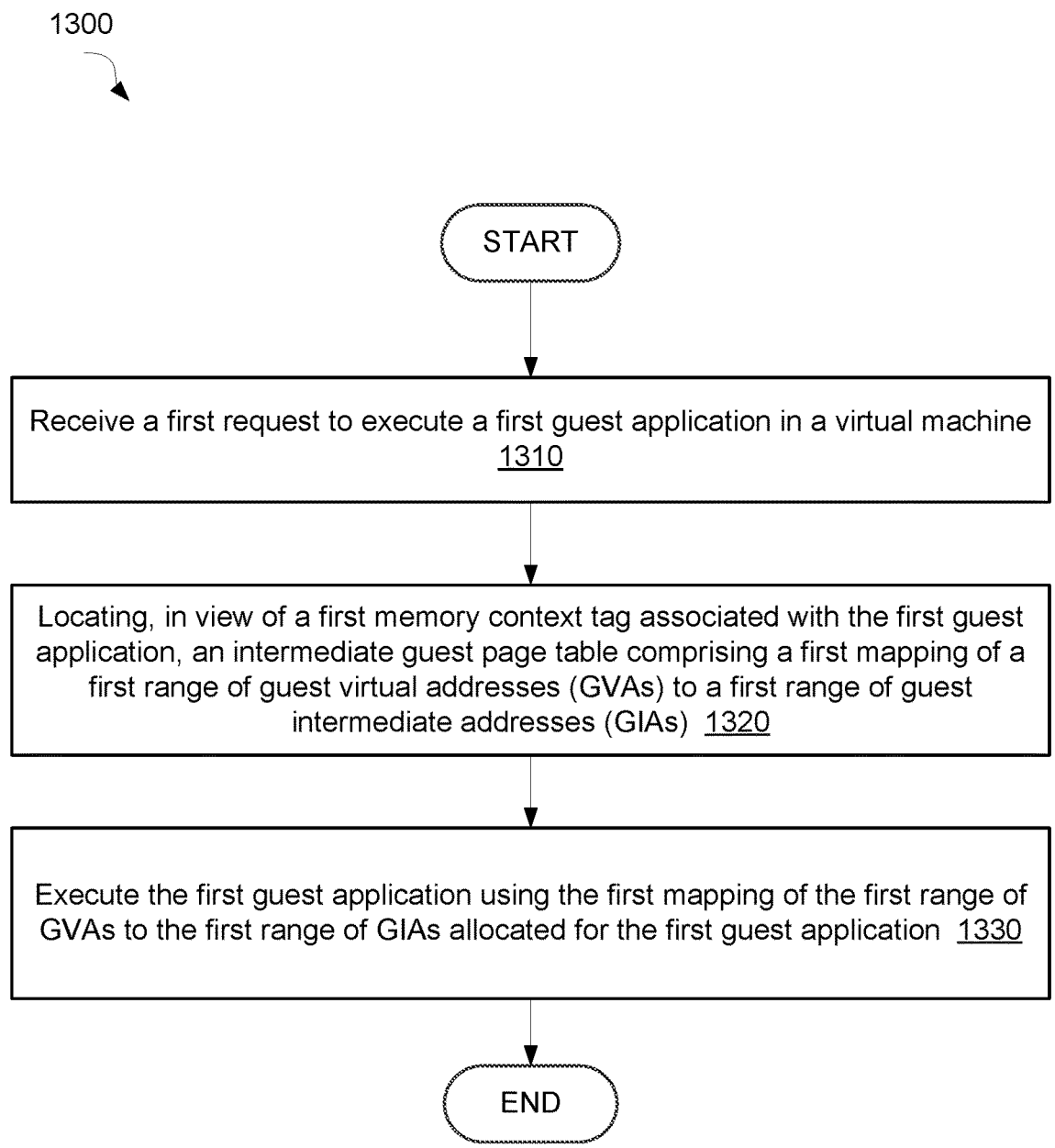
FIG. 13 is a flow diagram illustrating an example of a method for a virtual machine executing a first guest application using guest intermediate addresses identified via a memory context tag associated with the first guest application, in accordance with one or more aspects of the present disclosure.

FIG. 13 is a flow diagram illustrating an example of a method 1300 for a virtual machine 170 executing a first guest application 184 using guest intermediate addresses identified via a memory context tag 1100 associated with the first guest application 184, in accordance with one or more aspects of the present disclosure. Method 1300 includes operations performed by the host 100. Also, method 1300 may be performed in the same or a similar manner as described above in regards to method 400. Method 1300 may be performed by processing devices of the host 100 executing the guest paging agent 182 of the virtual machine 170.

A first guest application and a second guest application may be part of the guest operating system 180. A first range of GIAs may be allocated for the first guest application in the guest intermediate address space 1102 and a first memory context tag (e.g., host address space identifier (HASID)) may be stored in the first range of GIAs. The first memory context tag may be encoded as one or more high bits within the first range of the GIAs. The first memory context tag may be associated with the first guest application. The first range of GIAs may correspond to the first range of GVAs used by the first guest application in size (e.g., 1 GB of GIAs may be allocated for 1 GB of GVAs). A single page table entry, or a small number of large page table entries, may be added to the intermediate guest page table 194 that maps the first range of GVAs to the first range of GIAs including the first memory context tag associated with the first guest application.

Additionally, a second range of GIAs may be allocated for the second guest application in the guest intermediate address space 1102 and a second memory context tag may be stored in the second range of GIAs. The first and second ranges of GIAs may be allocated at higher addresses than a highest address of addresses in the guest physical address space 198 mapped to the RAM for the virtual machine 170. The second memory context tag may be encoded as one or more high bits within the second range of the GIAs. The second memory context tag may be associated with the second guest application. The second range of GIAs may correspond to the first range of GVAs used by the second guest application in size (e.g., 1 GB of GIAs may be allocated for 1 GB of GVAs). In some embodiments, the first range of GVAs may be used by both the first and second applications. Another single page table entry may be added to the intermediate guest page table 194 that maps the first range of GVAs to the second range of GIAs for the including the second memory context tag associated with the second guest application.

At block 1310, a processing device may receive a first request to execute the first guest application in the virtual machine 170. At block 1320, a processing device may locate, in view of the first memory context tag associated with the first guest application, an intermediate guest page table 194 including a first mapping of the first range of GVAs to the first range of GIAs. The first range of GIAs may be allocated for the first guest application in the guest physical address space 198 separate from other addresses in the guest physical address space 198 mapped to random access memory (RAM) for the virtual machine 170.

At block 1320, the processing device may execute the first guest application using the first mapping of the first range of GVAs to the first range of GIAs allocated for the first guest application. The hypervisor 130 may use the intermediate host page table 142 to translate the range of GIAs identified for the first guest application to a respective range of host physical addressees (HPAs). Accordingly, the processing device may translate the range of GVAs accessed by the first guest application to the range of GIAs allocated for the first guest application using the intermediate guest page table 194 in view of the memory context tag associated with the first guest application, and may translate the range of GIAs to the respective range of HPAs using the intermediate host page table 142.

In some embodiments, the processing device may receive a second request to switch execution to a second guest application in the virtual machine 170. The processing device may locate, in view of the second memory context tag associated with the second application, the intermediate guest page table including a second mapping of the first range of GVAs to a second range of GIAs. The second range of GIAs may be allocated for the second guest application in the guest physical address space 198 separate from the other addresses in the guest physical address space mapped to the RAM for the virtual machine and separate from the first range of GIAs. For example, a first portion (0-1 GB) of the guest physical address space 198 may be allocated for the virtual machine 170, a second portion of the guest physical address space 198 may be allocated for the first guest application (1 GB-2 GB), and a third portion of the guest physical address space 198 may be allocated for the second guest application (2 GB-3 GB). As discussed above, the ranges of GIAs allocated for the first and second guest applications may be part of the guest intermediate address space 1102.

The processing device may execute, without transitioning control to the hypervisor, the second guest application using the second mapping of the range of GVAs to the second range of GIAs allocated for the second guest application. As such, the number of virtual machine exit instructions executed may be reduced and the computing performance may be enhanced. Further, the processing device may create a communication page table 196 that includes mappings from the first range of GIAs to a first range of guest physical addresses (GPAs) and from the second range of GIAs to a second range of GPAs. The mappings of the ranges of GIAs to the ranges of GPAs may remain static during switching execution from the first guest application to the second guest application. In other words, switching execution from the first guest application to the second guest application may not involve updating the mappings in the communication page table to avoid switching control to the hypervisor 130.

In some embodiments, it may be desirable to maintain a large number of guest applications running on the virtual machine 170. As such, multiple memory context tags may be maintained for the guest applications in multiple ranges of GIAs allocated for the guest applications executing on the virtual machine 170. Each of the memory context tags may be associated with a respective application. However, as discussed above, the number of memory context tags may be limited by architectural constraints.

Accordingly, in response to more than a threshold number of guest applications executing on the virtual machine 170, the processing device may disable the use of memory context tags in the GIAs for a portion of the guest applications, while enabling he use of the memory context tags for another portion of the guest applications. For the portion of guest applications where memory context tagging is disabled, the initial guest page table 192 and the initial host page table 142 may be used by the processing device to translate virtual addresses to physical addresses.

In some embodiments, the processing device may share the memory context tags for different guest applications. For example, the first memory context tag associated with the first guest application may be reused with another guest application by storing the first memory context tag in a different range of GIAs for the other guest application. Accordingly, when a request is received to execute the other guest application having the first memory context tag, the guest paging agent 182 may notify the hypervisor 130 to update mappings related to the range of GIAs allocated to the other guest application in the intermediate host page table 144.

In some embodiments, the guest operating system 180 may receive a request to add another guest application to the virtual machine 170. The guest paging agent 182 may determine that a maximum number of memory context tags have been used. The guest paging agent 182 may cause the hypervisor 130 to flush the translation lookaside buffer (TLB) 114 including the intermediate guest page table 194 including the mappings of the ranges of GVAs to the ranges of GIAs including the memory context tags. The guest paging agent 182 may rebuild the intermediate guest page table 194 by storing a first memory context tag, which was previously used for another guest application, for the new guest application in a range of GIAs starting at address 0 of the guest intermediate address space 1102. The first memory context tag may be associated with the new guest application. The guest paging agent 182 may add a page table entry for the range of GVAs of the new guest application mapped to the range of GIAs including the first memory tag associated with the new guest application.

Figure 14:
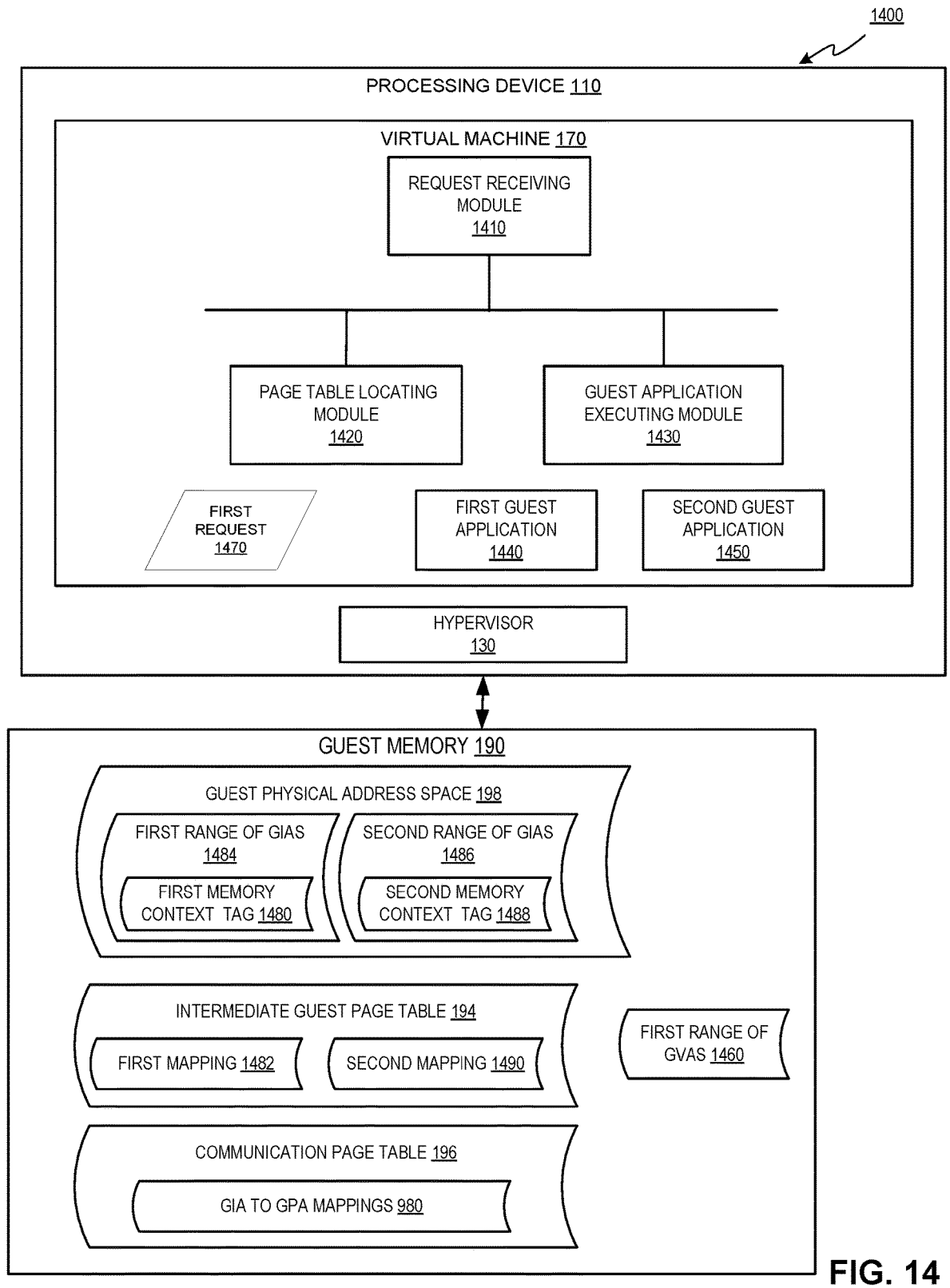
FIG. 14 depicts a block diagram of an example computer system for performing the method of FIGS. 13 and 15-17, in accordance with one or more aspects of the present disclosure.

FIG. 14 depicts a block diagram of an example computer system 1400 for performing the methods of FIGS. 13 and 15-17, in accordance with one or more aspects of the present disclosure. Computer system 1400 may be the same or similar to the host 100 and may include one or more processing devices and one or more memory devices. In the example shown, computer system 1500 may include the processing device 110 executing a virtual machine 170 including a request receiving module 1410, a page table locating module 1420, and a guest application executing module 1430. The virtual machine 170 may also execute a first guest application 1440 and a second guest application 1450. The processing device 110 may also execute the hypervisor 130.

Also, as depicted, the processing device 110 may be communicatively coupled to the guest memory 190 and the host memory 140. The guest memory 190 may include the guest physical address space 198, the intermediate guest page table 194, and the communication page table 196. The guest physical address space 198 may include a first range of GIAs 1484 allocated for the first guest application 1440 and a second range of GIAs 1486 allocated for the second guest application 1450. The first range of GIAs 1484 may store a first memory context tag 1480 associated with the first guest application 1440, and the second range of GIAs 1486 may store a second memory context tag 1488 associated with the second guest application 1450. The intermediate guest page table 194 may include a first mapping 1482 of a first range of GVAs 1460 to the first range of GIAs 1484 and a second mapping 1490 of the first range of GVAs 1460 to the second range of GIAs 1486. The communication page table 196 may include the GIA to GPA mappings 980. The guest memory 190 may also include the first range of GVAs 1460 for the first guest application 1440 and the second guest application 1450.

The request receiving module 1410 may receive a first request 1470 to execute the first guest application 1440 in the virtual machine 170. The page table locating module 1420 may locate, in view of a first memory context tag 1480 associated with the first guest application 1440, an intermediate guest page table 194 including the first mapping 1482 of the first range of GVAs 1460 to the first range of GIAs 1484. The first range of GIAs 1484 may be allocated for the first guest application 1440 in the guest physical address space 198 separate from other addresses in the guest physical address space 198 mapped to random access memory (RAM) for the virtual machine 170. The guest application executing module 1430 may execute the first guest application using the first mapping of the first range of GVAs to the first range of GIAs allocated for the first guest application.

In some embodiments, the request receiving module 1410 may receive a second request to switch execution to the second guest application 1450 in the virtual machine 170. The page table locating module 1420 may locate, in view of the second memory context tag 1488 associated with the second guest application 1450, the intermediate guest page table 194 including the second mapping 1490 of the first range of GVAs 1460 to the second range of GIAs 1486. The second range of GIAs 1486 may be allocated for the second guest application 1450 in the guest physical address space 198 separate from the other addresses in the guest physical address space 198 mapped to the RAM for the virtual machine and separate from the first range of GIAs 1484. The guest application executing module 1430 may execute, without transitioning control to the hypervisor 130, the second guest application 1450 using the second mapping 1490 of the first range of GVAs 1460 to the second range of GIAs 1486 allocated for the second guest application 1450.

Figure 15:
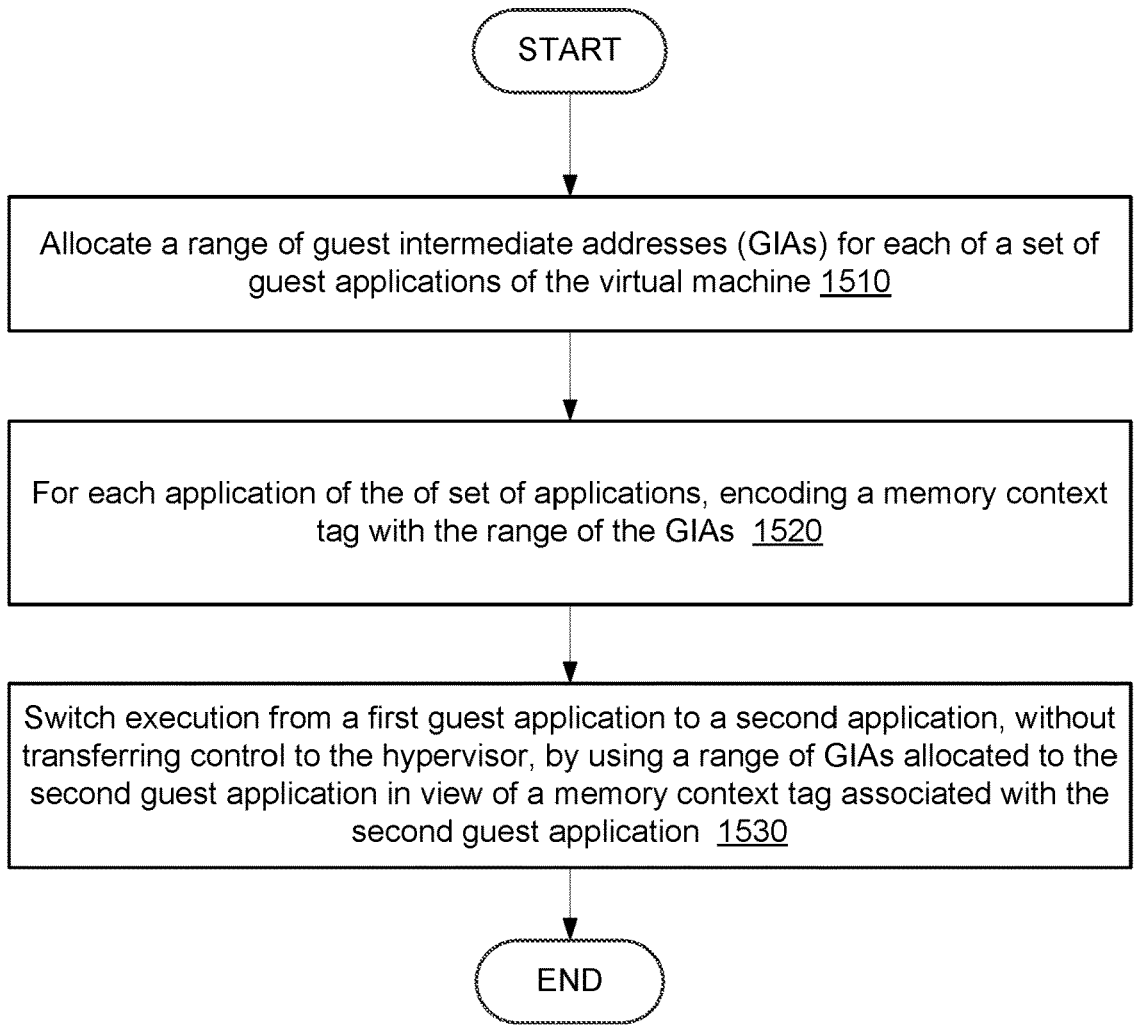
FIG. 15 is a flow diagram illustrating an example of a method for a virtual machine switching execution to a second guest application using a memory context tag without transferring control to a hypervisor, in accordance with one or more aspects of the present disclosure.

FIG. 15 is a flow diagram illustrating an example of a method 1500 for a virtual machine 170 switching execution to a second guest application using a memory context tag without transferring control to a hypervisor 130, in accordance with one or more aspects of the present disclosure. Method 1500 includes operations performed by the host 100. Also, method 1500 may be performed in the same or a similar manner as described above in regards to method 400. Method 1500 may be performed by processing devices 110 of the host 100 executing the guest paging agent 182 of the virtual machine 170.

At block 1510, a processing device may allocate a range of guest intermediate addresses (GIAs) for each of a set of guest applications 184 of the virtual machine 170. The GIAs may be allocated in a guest physical address space 198 separate from other addresses in the guest physical address space 198 mapped to random access memory (RAM) for the virtual machine 170. In some embodiments, the GIAs may be allocated at higher addresses than a highest address of the other addresses in the guest physical address space 198 mapped to the RAM for the virtual machine 170.

At block 1520, for each of the plurality of guest applications 184, the processing device may encode a memory context tag 1100 with the range of the GIAs, wherein the memory context tag 1100 is associated with a respective guest application 184 of the plurality of guest applications. At block 1530, the processing device may switch execution from a first guest application 1440 of the set of guest applications 184 to a second guest application 1450 of the plurality of guest applications 184, without transferring control to the hypervisor 130, by using a range of GIAs allocated to the second guest application 1450 in view of a memory context tag 1488 associated with the second guest application 1450.

Figure 16:
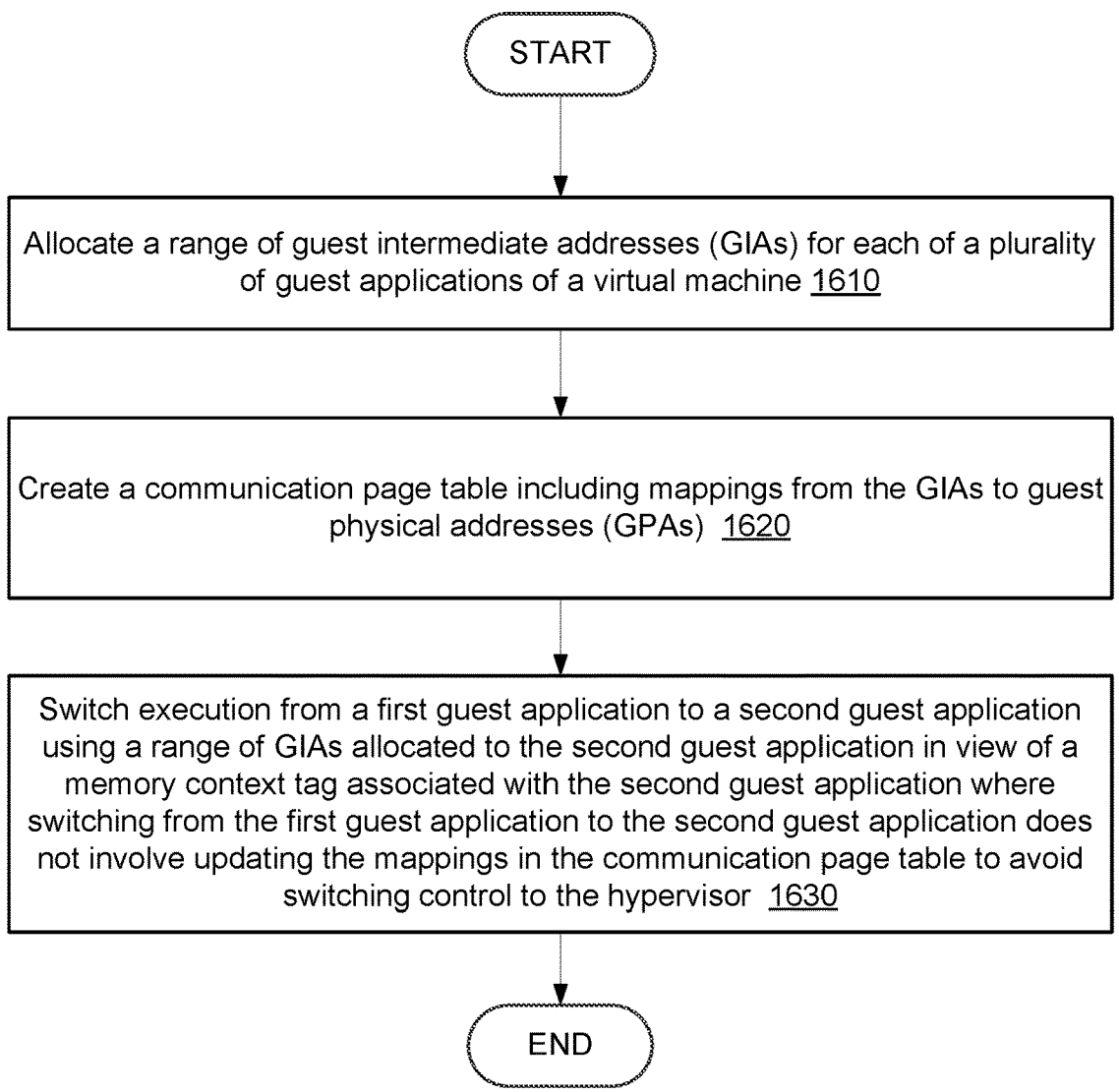
FIG. 16 is a flow diagram illustrating an example of a method for a virtual machine switching execution to a second guest application using a memory context tag without updating mappings in a communication page table to avoid transferring control to the hypervisor, in accordance with one or more aspects of the present disclosure.

FIG. 16 is a flow diagram illustrating an example of a method 1600 for a virtual machine 170 switching execution to a second guest application 1450 using a memory context tag without updating mappings in a communication page table 196 to avoid transferring control to the hypervisor 130, in accordance with one or more aspects of the present disclosure. Method 1600 includes operations performed by the host 100. Also, method 1600 may be performed in the same or a similar manner as described above in regards to method 400. Method 1600 may be performed by processing devices 110 of the host 100 executing the guest paging agent 182 of the virtual machine 170.

At block 1610, a processing device may allocate a range of guest intermediate addresses (GIAs) for each of a set of guest applications 184 of the virtual machine 170. Each of the range of GIAs includes a memory context tag associated with a respective guest application of the set of guest applications. In some embodiments, the range of GIAs for each of the set of guest applications 184 may be allocated contiguously in the guest physical address space 198 and the range of GIAs for each of the set of guest applications may not overlap. Further, the range of GIAs for each of the set of guest applications 184 may be allocated at higher addresses in the guest physical address space 198 than other addresses in the guest physical address space 198 mapped to RAM for the virtual machine 170.

At block 1620, the processing device may create a communication page table 196 including mappings from the GIAs to guest physical addresses (GPAs). The communication page table 196 may be stored in the guest memory 180.

At block 1630, the processing device may switch execution from a first guest application 1440 of the set of guest applications 184 to a second guest application 1450 of the et of guest applications 184 using a range of GIAs 1486 allocated to the second guest application 1450 in view of a memory context tag 1488 associated with the second guest application 1450. Switching from the first guest application to the second guest application may not involve updating the mappings in the communication page table 196 to avoid switching control to the hypervisor 130.

Figure 17:
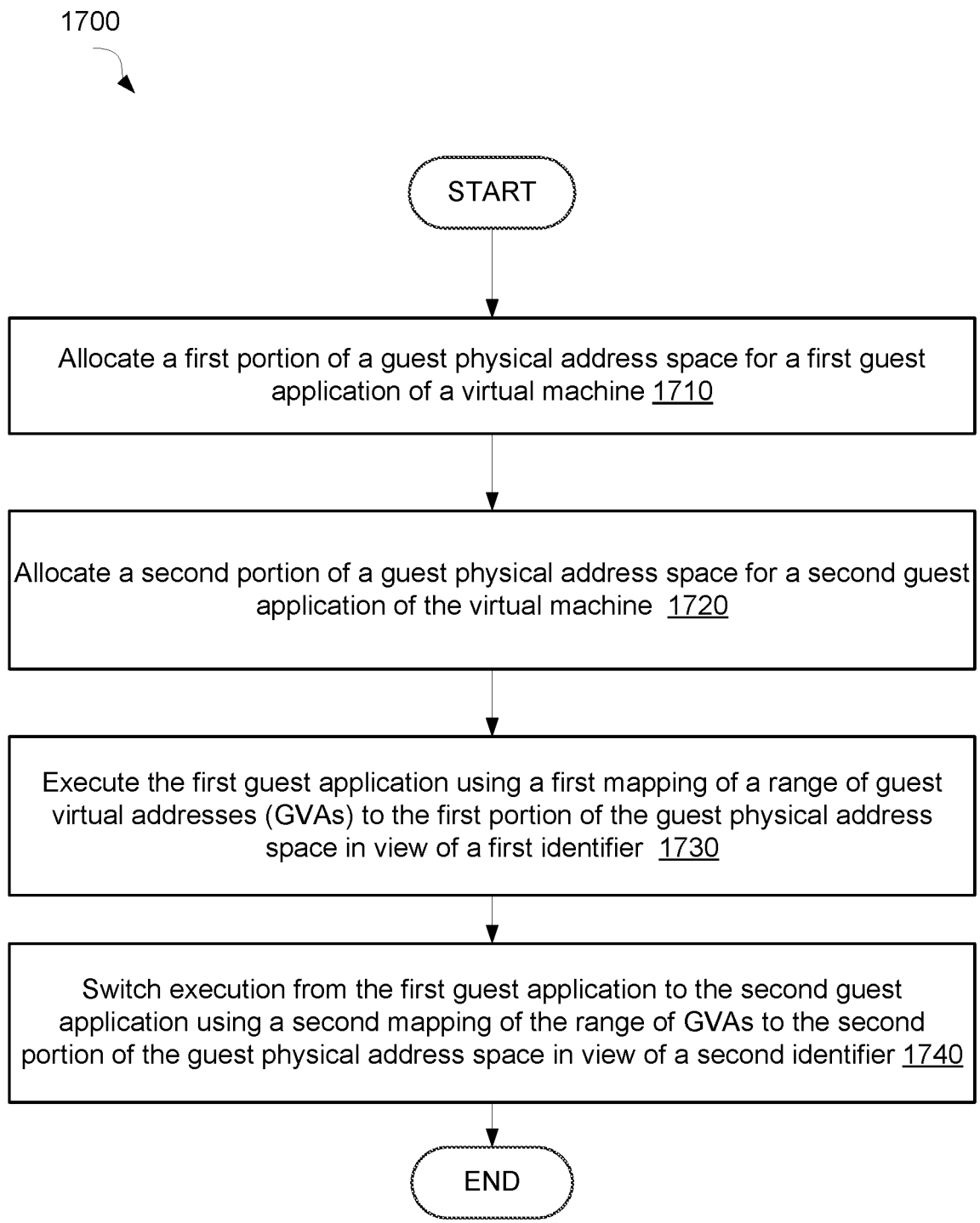
FIG. 17 is a flow diagram illustrating an example of a method for a virtual machine allocating portions of a guest physical address space to guest applications and switching execution between the guest applications using the portions, in accordance with one or more aspects of the present disclosure.

FIG. 17 is a flow diagram illustrating an example of a method 1700 for a virtual machine 170 allocating portions of a guest physical address space 198 to guest applications 184 and switching execution between the guest applications 184 using the portions, in accordance with one or more aspects of the present disclosure. Method 1700 includes operations performed by the host 100. Also, method 1700 may be performed in the same or a similar manner as described above in regards to method 400. Method 1700 may be performed by processing devices 110 of the host 100 executing the guest paging agent 182 of the virtual machine 170.

At block 1710, a processing device may allocate a first portion (e.g., first range of GIAs 1484) of a guest physical address space 198 for a first guest application 1440 of the virtual machine 170. The first portion (e.g., first range of GIAs 1484) is to store a first identifier (e.g., first memory context tag 1480) associated with the first guest application 1440.

At block 1720, the processing device may allocate a second portion (e.g., second range of GIAs 1486) of the guest physical address space 198 for a second guest application 1450 of the virtual machine 170. The second portion (e.g., second range of GIAs 1486) is to store a second identifier (e.g., second memory context tag 1488) of the second guest application 1450. The first portion may include a first contiguous range of GIAs 1484 in the guest physical address space 198, and the second portion may include a second contiguous range of GIAs 1486 in the guest physical address space 198. The first portion and the second portion may be separate from a third portion (0 to 1 GB) of the guest physical address space 198 that is allocated to the virtual machine 170. The first portion (e.g., 1 GB to 2 GB) may begin at an address subsequent to the third portion (e.g., 0 to 1 GB) of the guest physical address space 198, and the second portion (e.g., 2 GB to 3 GB) may begin at an address subsequent to the first portion (e.g., 1 GB to 2 GB).

At block 1730, the processing device may execute the first guest application 1440 using a first mapping 1482 of a range of guest virtual addresses (GVAs) 1460 to the first portion (e.g., first range of GIAs 1484) of the guest physical address space 198 in view of the first identifier (e.g., first memory context tag 1480). At block 1740, the processing device may switch execution from the first guest application 1440 to the second guest application 1450 using a second mapping 1490 of the range of GVAs 1460 to the second portion (e.g., second range of GIAs 1486) of the guest physical address space 198 in view of the second identifier (e.g., second memory context tag 1488).

Figure 18:
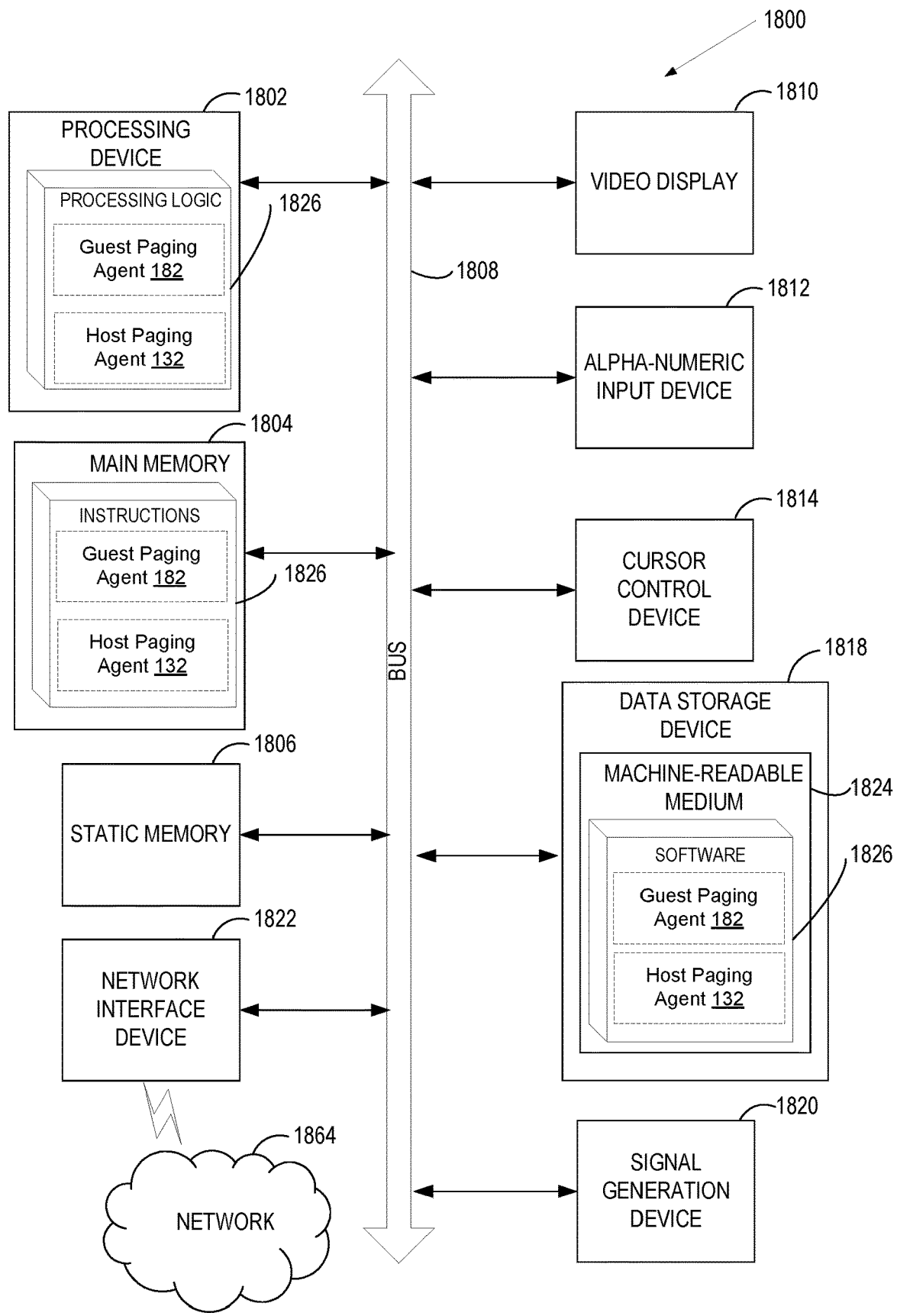
FIG. 18 depicts a block diagram of an illustrative computing device operating in accordance with the examples of the present disclosure.

FIG. 18 depicts a block diagram of an illustrative computing device operating in accordance with the examples of the present disclosure. In various illustrative examples, computer system 1800 may correspond to a computing device similar to host 100 of FIG. 1. In one implementation, the computer system 1800 may be the host 100. The computer system 1800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 1800 may be connected (e.g., via a network, such as a Local Area Network (LAN), an intranet, an extranet, or the Internet) to other computer systems. Computer system 1800 may operate in the capacity of a server or a client computer in a client-server environment, or as a peer computer in a peer-to-peer or distributed network environment. Computer system 1800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1800 may include a processing device 1802, a volatile memory 1804 (e.g., random access memory (RAM)), a non-volatile memory 1806 (e.g., read-only memory (ROM) or electrically-erasable programmable ROM (EEPROM)), and a data storage device 1816, which may communicate with each other via a bus 1808.

Processing device 1802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1800 may further include a network interface device 1822. Computer system 1800 also may include a video display unit 1810 (e.g., an LCD), an alphanumeric input device 1812 (e.g., a keyboard), a cursor control device 1814 (e.g., a mouse), and a signal generation device 1820.

Data storage device 1816 may include a non-transitory computer-readable storage medium 1824 on which may store instructions 1826 encoding any one or more of the methods or functions described herein, including instructions implementing guest paging agent 182 and/or host paging agent 132 of FIG. 1 for implementing the various methods described herein.

Instructions 1826 may also reside, completely or partially, within volatile memory 1804 and/or within processing device 1802 during execution thereof by computer system 1800, hence, volatile memory 1804 and processing device 1802 may also constitute machine-readable storage media.

While computer-readable storage medium 1824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the methods described herein, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method for a virtual machine executed by a hypervisor, the method comprising: identifying, for the virtual machine, mappings between a range of guest virtual addresses (GVAs) and a range of guest physical addresses (GPAs) that remain the same in an initial guest page table for a threshold period of time; creating an intermediate guest page table including one or more page table entries that map the range of the GVAs to a range of guest intermediate addresses (GIAs); and causing the GVA to be translated to a GIA using the intermediate guest page table in view of the one or more page table entries, wherein the translation is triggered responsive to a guest application of the virtual machine attempting to access a GVA in the range of the GVAs.

Example 2 is the method of Example 1, further comprising, prior to creating the intermediate guest page table, allocating the range of the GIAs for the range of the GVAs, wherein the GIAs are allocated in a guest physical address space that is separate from other addresses in the guest physical address space mapped to random access memory (RAM) for the virtual machine.

Example 3 is the method of Example 1, wherein the range of GIAs are allocated at higher addresses than a highest address of the other addresses in the guest physical address space mapped to RAM for the virtual machine.

Example 4 is the method of Example 1, further comprising translating the range of the GVAs to the range of the GPAs as first mappings; and creating, using the first mappings and the one or more page table entries that map the range of the GVAs to the range of the GIAs, a guest communication page table comprising mappings of the range of the GIAs to the range of the GPAs as second mappings.

Example 5 is the method of Example 4, further comprising notifying the hypervisor of the guest communication page table to enable the hypervisor to create a host intermediate page table including one or more page table entries that map the range of GIAs to a range of host physical addresses (HPAs) using at least the second mappings.

Example 6 is the method of Example 4, further comprising sending the communication page table to the hypervisor to enable the hypervisor to create a host intermediate page table including one or more page table entries that map the range of GIAs to a range of host physical addresses (HPAs) using at least the second mappings.

Example 7 is the method of Example 1, wherein translating the GVA to the GIA uses a fewer number of levels of the intermediate guest page table than a number of levels of the initial guest page table used to translate the GVA to a GPA.

Example 8 is the method of Example 1, wherein control is transitioned to the hypervisor in response to the guest application of the virtual machine attempting to access the GVA in the range of the GVAs, and the GIA mapped to the GVA is passed to the hypervisor to cause the hypervisor to identify the GIA and search a communication page table for a mapping between the GIA and a GPA, and to create an entry in a host intermediate page table that maps the GIA to a host physical address using at least the mapping.

Example 9 is a non-transitory, computer-readable medium storing instructions for a virtual machine executed by a hypervisor, the instructions, when executed, cause a processing device to: identify, in an initial guest page table of the virtual machine, a range of guest virtual addresses (GVAs) for which mappings to guest physical addresses (GPAs) remain the same; allocate a range of guest intermediate addresses (GIAs) for the range of the GVAs, wherein the GIAs are allocated in a guest physical address space separate from other addresses in the guest physical address space mapped to random access memory (RAM) for the virtual machine; create an intermediate guest page table including one or more page table entries that map the range of the GVAs to the range of the GIAs as first mappings; translate the range of the GVAs to the range of the GPAs as second mappings; translate, using the first mappings and the second mappings, the range of the GIAs to the range of the GPAs as third mappings; and communicate the third mappings to the hypervisor.

Example 10 is the computer-readable medium of Example 9, wherein to communicate the third mappings to the hypervisor the processing device is further to at least one of send a communication page table including the third mappings to the hypervisor or notify the hypervisor of the third mappings to enable the hypervisor to retrieve the third mappings.

Example 11 is the computer-readable medium of claim 9, wherein communicating the third mappings to the hypervisor causes the hypervisor to create an intermediate host page table that maps the range of GIAs to a range of host physical addresses using at least the third mappings.

Example 12 is the computer-readable medium of claim 9, wherein the processing device is further to: receive, from a guest application of the virtual machine, a request to access a GVA in the range of GVAs; and cause translation of the GVA to a respective GIA in the range of GIAs using the intermediate guest page table.

Example 13 is the computer-readable medium of claim 12, wherein the processing device is further to, responsive to receiving, from the guest application of the virtual machine, the request to access the GVA in the range of the GVAs, cause transition of control to the hypervisor by passing the respective GIA to the hypervisor to cause the hypervisor to locate a fourth mapping between the respective GIA and a GPA using the third mappings, and to create an entry in a host intermediate page table that maps the GIA to a host physical address using at least the fourth mapping.

Example 14 is the computer-readable medium of claim 12, wherein translating the GVA to the respective GIA uses a fewer number of levels of the intermediate guest page table than a number of levels of the initial guest page table used to translate the GVA to a GPA.

Example 15 is a method for a hypervisor executing a virtual machine, the method comprising: obtaining first mappings of guest intermediate addresses (GIAs) to guest physical addresses (GPAs); obtaining, from one or more initial host page tables of the hypervisor, second mappings of the GPAs to host physical addresses (HPAs); creating an intermediate host page table including entries that map the GIAs to the HPAs using the first mappings and the second mappings; and causing a respective HPA to be accessed responsive to the virtual machine accessing a GVA in an intermediate guest page table that maps the GVA to a corresponding GIA.

Example 16 is the method of Example 15, wherein obtaining the first mappings of the GIAs to the GPAs further comprises retrieving the first mappings from a memory location shared by the hypervisor and the virtual machine.

Example 17 is the method of Example 15, wherein obtaining the first mappings of the GIAs to the GPAs further comprises receiving the first mappings from the virtual machine.

Example 18 is the method of Example 15, further comprising, responsive to a guest application executing on the virtual machine accessing a second GVA that lacks a corresponding second GIA mapped to a second HPA in the intermediate host page able: receiving control from a processing device; triggering a page fault in the hypervisor; and forwarding the page fault to the virtual machine.

Example 19 is the method of Example 15, wherein the GIAs are allocated by the virtual machine in a first portion of a guest physical address space that is separate from a second portion of the guest physical address space that includes addresses mapped to random access memory (RAM) for the virtual machine.

Example 20 is the method of Example 15, further comprising detecting the virtual machine accessing a GVA in an intermediate guest page table that maps the GVA to a corresponding GIA.

Example 21 is a non-transitory, computer-readable medium storing instructions for a hypervisor executing a virtual machine, the instructions, when executed, cause a processing device to: responsive to control being transitioned to the hypervisor from the virtual machine, obtain, from the virtual machine, a first mapping of a guest intermediate address (GIA) to a guest physical address (GPA), wherein the GIA is in a guest physical address space and is not mapped to random access memory (RAM) for the virtual machine; obtain, from an initial host page table of the hypervisor, a second mapping of the GPA to a host physical address (HPA); and create, using the first mapping and the second mapping, an intermediate host page table including an entry that maps the GIA to the HPA.

Example 22 is the computer-readable medium of Example 21, wherein the virtual machine transitions control to the hypervisor responsive to an access, by a guest application executing on the virtual machine, to a guest virtual address (GVA) that is mapped to the GIA.

Example 23 is the computer-readable medium of Example 21, wherein to obtain the first mappings of the GIA to the GPA, the processing device is further to retrieve the first mapping from a memory location shared by the hypervisor and the virtual machine.

Example 24 is the computer-readable medium of Example 21, wherein to obtain the first mappings of the GIA to the GPA, the processing device is further to receive the first mapping from the virtual machine.

Example 25 is the computer-readable medium of Example 21, wherein the processing device is further to receive the GIA from the virtual machine as part of the control transition.

Example 26 is the computer-readable medium of Example 21, wherein the processing device is further to return control to the virtual machine to enable virtual memory accesses to guest virtual addresses (GVAs) to be translated to corresponding HPAs.

Example 27 is a system comprising: a memory device storing instructions; and a processing device coupled to the memory device, the processing device to execute the instructions to: execute a hypervisor to: obtain, from a communication page table of a virtual machine executing via the hypervisor, first mappings of a range of guest intermediate addresses (GIAs) to a range of guest physical addresses (GPAs); obtain, from one or more initial host page tables, second mappings of the GPAs to a range of host physical addresses (HPAs); and create, using the first mappings and the second mappings, an intermediate host page table including intermediate page table entries that map the range of GIAs to the range of HPAs.

Example 28 is the system of Example 27, wherein the GIAs are allocated in a guest physical address space separate from other addresses of the guest physical address space that are mapped to random access memory (RAM) for the virtual machine.

Example 29 is the system of Example 27, wherein the processing device is further to execute the hypervisor to, responsive to a guest application executing on the virtual machine accessing a guest virtual address (GVA) that lacks a corresponding GIA mapped to a HPA in the intermediate host page table: receive control from the virtual machine; trigger a page fault in the hypervisor; and forward the page fault to the virtual machine.

Example 30 is the system of Example 27, wherein the virtual machine creates an intermediate guest page table including a single page table entry that maps a range of guest virtual addresses (GVAs) to the range of GIAs, and the intermediate guest page table is used to translate accesses to the range of GVAs to the range of GIAs to enable the hypervisor to translate the range of GIAs to the range of HPAs.

Example 31 is an apparatus, comprising: means for identifying, for the virtual machine, mappings between a range of guest virtual addresses and a range of guest physical addresses that remain the same in a guest page table for a threshold period of time; means for creating an intermediate guest page table including one or more page table entries that map the range of the guest virtual addresses to a range of guest intermediate addresses; and responsive to a guest application of the virtual machine attempting to access a guest virtual address in the range of the guest virtual addresses, means for translating the guest virtual address to a guest intermediate address using the intermediate guest page table in view of the one or more page table entries.

Example 32 is the apparatus of Example 31, further comprising, prior to creating the intermediate guest page table, means for allocating the range of the GIAs for the range of the GVAs, wherein the GIAs are allocated in a guest physical address space that is separate from other addresses in the guest physical address space mapped to random access memory (RAM) for the virtual machine.

Example 33 is the apparatus of Example 31, further comprising means for translating, using the initial guest page table, the range of the GVAs to the range of the GPAs as first mappings; and means for creating, using the first mappings and the one or more page table entries that map the range of the GVAs to the range of the GIAs, a guest communication page table comprising mappings of the range of the GIAs to the range of the GPAs as second mappings.

Example 34 is the apparatus of Example 31, further comprising means for notifying the hypervisor of the guest communication page table to enable the hypervisor to create a host intermediate page table including one or more page table entries that map the range of GIAs to a range of host physical addresses (HPAs) using at least the second mappings.

What is claimed is:

1. A method for a virtual machine executed by a hypervisor, the method comprising:
identifying, for the virtual machine, address mappings that remain unchanged in an initial guest page table for a threshold period of time, wherein the address mappings are between a range of guest virtual addresses (GVAs) and a range of guest physical addresses (GPAs), and wherein the initial guest page table comprises a plurality of levels;
creating an intermediate guest page table including one or more page table entries that map the range of the GVAs from the identified address mappings to a range of guest intermediate addresses (GIAs), wherein the intermediate guest page table comprises fewer levels than the initial guest page table; and
causing a first GVA in the range of GVAs to be translated to a first GIA in the range of GIAs using the intermediate guest page table in view of the one or more page table entries, wherein the translation is triggered in response to a guest application of the virtual machine attempting to access the first GVA in the range of GVAs.

2. The method of claim 1, further comprising, prior to creating the intermediate guest page table, allocating the range of GIAs for the range of GVAs, wherein the range of GIAs are allocated in a guest physical address space, wherein the range of GIAs allocated in the guest physical address space is separate from other addresses in the guest physical address space, and wherein the range of GIAs is allocated for the virtual machine and mapped to random access memory (RAM).

3. The method of claim 2, wherein the range of GIAs are allocated at higher addresses than a highest address of the other addresses in the guest physical address space.

4. The method of claim 1, further comprising translating the range of GVAs to the range of GPAs as first mappings; and creating, using the first mappings and the one or more page table entries that map the range of GVAs to the range of GIAs, a guest communication page table comprising mappings of the range of GIAs to the range of GPAs as second mappings.

5. The method of claim 4, further comprising notifying the hypervisor of the guest communication page table to enable the hypervisor to create a host intermediate page table including one or more page table entries that map the range of GIAs to a range of host physical addresses (HPAs) using at least the second mappings.

6. The method of claim 4, further comprising sending the communication page table to the hypervisor to enable the hypervisor to create a host intermediate page table including one or more page table entries that map the range of GIAs to a range of host physical addresses (HPAs) using at least the second mappings.

7. The method of claim 1, wherein translating the first GVA in the range of GVAs to the first GIA in the range of GIAs uses a fewer number of levels of the intermediate guest page table than a number of levels of the initial guest page table used to translate the first GVA to a first GPA of the range of GPAs.

8. The method of claim 1, wherein control is transitioned to the hypervisor in response to the guest application of the virtual machine attempting to access the first GVA in the range of GVAs, and wherein the first GIA to which the first GVA is translated is passed to the hypervisor to cause the hypervisor to identify the first GIA and search a communication page table for a mapping between the first GIA and a corresponding GPA in the range of GPAs, and to create an entry in a host intermediate page table that maps the first GIA to a host physical address using at least the mapping.

9. A non-transitory, computer-readable medium storing instructions for a virtual machine executed by a hypervisor, the instructions, when executed, cause a processing device to:
identify, in an initial guest page table of the virtual machine, a range of guest virtual addresses (GVAs) for which mappings to a range of guest physical addresses (GPAs) remain unchanged for a threshold period of time, wherein the initial guest page table comprises a plurality of levels;
allocate a range of guest intermediate addresses (GIAs) for the range of GVAs, wherein the range of GIAs are allocated in a guest physical address space, wherein the range of GIAs allocated in the guest physical address space is separate from other addresses in the guest physical address space, wherein the range of GIAs is allocated for the virtual machine and mapped to random access memory (RAM);
create an intermediate guest page table including one or more page table entries that map the range of GVAs to the range of GIAs as first mappings, wherein the intermediate guest page table comprises fewer levels than the initial guest page table;
translate the range of GVAs to the range of GPAs as second mappings;
translate, using the first mappings and the second mappings, the range of GIAs to the range of GPAs as third mappings; and
communicate the third mappings to the hypervisor.

10. The computer-readable medium of claim 9, wherein to communicate the third mappings to the hypervisor, the processing device is further to perform at least one of sending a communication page table including the third mappings to the hypervisor or notifying the hypervisor of the third mappings to enable the hypervisor to retrieve the third mappings.

11. The computer-readable medium of claim 9, wherein communicating the third mappings to the hypervisor causes the hypervisor to create an intermediate host page table that maps the range of GIAs to a range of host physical addresses using at least the third mappings.

12. The computer-readable medium of claim 9, wherein the processing device is further to:
receive, from a guest application of the virtual machine, a request to access a first GVA in the range of GVAs; and
cause translation of the first GVA to a respective GIA in the range of GIAs using the intermediate guest page table.

13. The computer-readable medium of claim 12, wherein the processing device is further to, responsive to receiving, from the guest application of the virtual machine, the request to access the first GVA in the range of GVAs, cause transition of control to the hypervisor by passing the respective GIA to the hypervisor to cause the hypervisor to locate a fourth mapping between the respective GIA and a first GPA in the range of GPAs using the third mappings, and to create an entry Ina host intermediate page table that maps the respective GIA to a host physical address using at least the fourth mapping.

14. The computer-readable medium of claim 12, wherein translating the first GVA to the respective GIA uses a fewer number of levels of the intermediate guest page table than a number of levels of the initial guest page table used to translate the first GVA to a first GPA in the range of GPAs.

15. A system comprising:
a memory; and
a processing device, coupled to the memory, to:
identify, for a virtual machine executed by the processing device and managed by a hypervisor, address mappings that remain unchanged in an initial guest page table for a threshold period of time, wherein the address mappings are between a range of guest virtual addresses (GVAs) and a range of guest physical addresses (GRAs), and wherein the initial guest page table comprises a plurality of levels;
create an intermediate guest page table including one or more page table entries that map the range of GVAs from the identified address mappings to a range of guest intermediate addresses (GIAs), wherein the intermediate guest page table comprises fewer levels than the initial guest page table; and
cause a first GVA in the range of GVAs to be translated to a first GIA in the range of GIAs using the intermediate guest page table in view of the one or more page table entries, wherein the translation is triggered in response to a guest application of the virtual machine attempting to access the first GVA in the range of GVAs.

16. The system of claim 15, wherein the processing device is further to:
prior to creating the intermediate guest page table, allocate the range of GIAs for the range of GVAs, wherein the range of GIAs are allocated in a guest physical address space, wherein the range of GIAs allocated in the guest physical address space is separate from other addresses in the guest physical address space, and wherein the range of GIAs is allocated for the virtual machine and mapped to random access memory (RAM).

17. The system of claim 16, wherein the range of GIAs are allocated at higher addresses than a highest address of the other addresses in the guest physical address space.

18. The system of claim 15, wherein the processing device is further to: translate the range of GVAs to the range of GPAs as first mappings; and create, using the first mappings and the one or more page table entries that map the range of GVAs to the range of GIAs, a guest communication page table comprising mappings of the range of GIAs to the range of GPAs as second mappings.

19. The system of claim 18, wherein the processing device is further to:
notify the hypervisor of the guest communication page table to enable the hypervisor to create a host intermediate page table including one or more page table entries that map the range of GIAs to a range of host physical addresses (HPAs) using at least the second mappings.

20. The method of claim 18, wherein the processing device is further to: send the guest communication page table to the hypervisor to enable the hypervisor to create a host intermediate page table including one or more page table entries that map the range of GIAs to a range of host physical addresses (HPAs) using at least the second mappings.

* * * * *